(12) United States Patent
Fujimoto

(10) Patent No.: US 6,222,651 B1
(45) Date of Patent: *Apr. 24, 2001

(54) HOLOGRAPHIC RESONANT SYSTEM AND METHOD

(76) Inventor: Kenneth Noboru Fujimoto, 200 Kelp St., Manhattan Beach, CA (US) 90266

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,676

(22) Filed: Feb. 10, 1998

(51) Int. Cl.⁷ ...................................................... G03H 1/28
(52) U.S. Cl. ............................. 359/24; 359/19; 359/22; 359/34; 365/216; 369/112
(58) Field of Search ........................... 359/24, 34, 19, 359/22; 365/216; 369/112

(56) References Cited

U.S. PATENT DOCUMENTS

| | | |
|---|---|---|
| 3,506,327 | 4/1970 | Leith et al. . |
| 3,633,989 | 1/1972 | Benton . |
| 3,838,903 | 10/1974 | Leith et al. . |
| 4,498,729 | 2/1985 | Benton . |
| 4,500,163 | 2/1985 | Burns et al. . |
| 4,958,892 | 9/1990 | Jannson et al. . |
| 4,959,283 | * 9/1990 | Smothers et al. ....................... 430/1 |
| 5,013,107 | 5/1991 | Biles . |
| 5,071,210 | * 12/1991 | Arnold et al. ....................... 359/19 |

(List continued on next page.)

FOREIGN PATENT DOCUMENTS

| | | |
|---|---|---|
| 0 344 810 A2 | 12/1989 | (EP) . |
| 0 545 524 A1 | 6/1993 | (EP) . |
| WO 90/15367 | 12/1990 | (WO) . |

OTHER PUBLICATIONS

William J. Farmer, Stephen A. Benton, Michael A. Klug, "The Application of the Edge–Lit Format to Holographic Stereograms," SPIE Proceedings, Practical Holigraphy V, vol. 1461, pp. 215–226, (Feb./Mar. 1991).*

Qiang Huang and H. John Caulfield, "Edge–Lit Reflection Holograms," SPIE Proceedings, International Symposium on Display Holography, vol. 1600, pp. 182–186 (Jul. 1991).*

Nicholas J. Phillips, Ce Wang, Terence E. Yeo, "Edge–Illuminated Holograms, Evanescent Waves and Related Optical Phenomena," SPIE Proceedings, vol. 1600, pp. 18–25 (Feb./Mar. 1991).*

Graham Saxby, "Practical Holography," pp. 1–10, 16–20, 42–56, 127–128 (1994).*

Primary Examiner—Cassandra Spyrou
Assistant Examiner—Craig Curtis
(74) Attorney, Agent, or Firm—Christensen O'Connor Johnson Kindness PLLC

(57) ABSTRACT

A holographic resonant system includes a plurality of volume phase holograms superimposed on a single layer of photosensitive film. The volume phase holograms are oriented with respect to one another such that a first volume phase hologram selects an incoming light beam incident upon a surface of the holographic resonant system having a wavelength $\lambda_{playback}$ and an angle of incidence $\theta_{in}$ and internally diffracts the incoming light beam to a second volume phase hologram. The second volume phase hologram then accepts the resulting diffracted light beam from the first volume phase hologram and diffracts the light beam to form an image reflected from the surface of the holographic resonant system at wavelength $\lambda_{playback}$ and an angle $\theta_{out}$. The result is a holographic resonant system that only permits light beams from a predetermined direction to illuminate the system, thereby reducing the effect of ambient light upon the system and thus increasing the contrast ratio of the image.

14 Claims, 14 Drawing Sheets

U.S. PATENT DOCUMENTS

| | | |
|---|---|---|
| 5,103,323 | 4/1992 | Magarinos et al. . |
| 5,187,597 | 2/1993 | Kato et al. . |
| 5,272,550 | 12/1993 | Dickson et al. . |
| 5,282,066 | 1/1994 | Yu et al. . |
| 5,331,445 | 7/1994 | Dickson et al. . |
| 5,455,693 | 10/1995 | Wreede et al. . |
| 5,526,145 | 6/1996 | Weber . |
| 5,534,386 | 7/1996 | Petersen et al. . |
| 5,537,232 | 7/1996 | Biles . |
| 5,602,657 | 2/1997 | Dickson et al. . |
| 5,606,433 | 2/1997 | Yin et al. . |
| 5,640,256 | 6/1997 | De Vré et al. . |
| 5,672,448 | 9/1997 | Isogai et al. . |
| 5,703,705 * | 12/1997 | Curtis et al. .......................... 359/22 |
| 5,710,645 | 1/1998 | Phillips et al. . |

\* cited by examiner

HOLOGRAPHIC RESONANT SYSTEM AND METHOD

FIELD OF THE INVENTION

The present invention relates to holograms in general, and in particular to volume phase holograms.

BACKGROUND OF THE INVENTION

Holograms are recordings in or on photosensitive plates of light intensity patterns created by the interference of two beams of mutually coherent light. Typically, one of the beams is produced by light waves from an object wave and the other beam is produced by light waves from a reference source. The light intensity patterns contain information on both the phase and amplitude of the light waves. This information is in coded form, and the hologram itself bears no resemblance to the object. Instead, the intensity patterns that form the hologram are in essence "fringes" that run through the thickness of the photosensitive plate. After processing, when the hologram is illuminated by the reference beam, light is diffracted from the hologram such that the object beam is reconstructed, thereby generating a wavefront that makes it appear as though the light had originated from the object and thus in essence, creating a three-dimensional image of the object.

There are two major categories of holograms: transmissive and reflective. Transmission holograms are created, in essence, by two wavefronts incident upon the photosensitive plate from the same side. On the other hand, reflection holograms are created by two wavefronts incident upon the photosensitive plate from opposite sides. In transmission holograms, the interference fringes recorded are roughly perpendicular to the photosensitive plate surface, somewhat like the slats of a venetian blind, whereas in reflection holograms, the interference fringes recorded are more nearly parallel with the surface of the plate, like the pages of a book. These two categories are further divided into two physical types of holograms: surface relief holograms and volume phase holograms.

Volume phase holograms work using the same principle as Bragg volume gratings. Bragg volume gratings are made up of multiple layers of material with different refractive indices. In volume phase holograms, the surfaces or "fringes" of these layers which have different refractive indices are created by two plane waves or two waves and are also referred to as "Bragg planes." In essence, volume phase holograms behave as if they consisted of multiple overlapped stacks of Bragg planes.

The direction and wavelength of light that is reflected from a single Bragg grating, and thus a volume phase hologram, depends upon how the layers are tipped and the distance between the layers. An efficient Bragg grating reflects almost all of the light rays that satisfy Bragg's Law, and lets light rays that do not satisfy the law pass through. Bragg's Law states that $n\lambda = 2d \cos \theta$, where n is an integer typically 1, $\lambda$ is the wavelength of the light ray, d is the distance between the Bragg planes, and $\theta$ is the angle, known as a "Bragg angle," between the light ray and the Bragg plane normal vector. A range of different wavelengths can satisfy Bragg's Law for a given grating. As determined by the equation, each wavelength of the visible spectrum has a different angle.

A problem with Bragg gratings and thus volume phase holograms, is that Bragg gratings are three-dimensional. Therefore, for a given wavelength $\lambda$, any Bragg grating can be illuminated within a wide arc of the Bragg angle $\theta$ centered on the Bragg plane normal. This effect produces an undesirable result when the hologram is illuminated, because light incident on the hologram from other directions, also referred to as ambient light, illuminates the hologram and causes a distortion or a lack of clarity in the desired object image. Therefore, there is a need for a holographic system wherein the acceptable angles of illumination are narrowed.

SUMMARY OF THE INVENTION

The present invention is a holographic resonant system for narrowing the range of illumination angles so that the system is only illuminated from a chosen angle, thus making the system insensitive to ambient light. The holographic resonant system includes a single layer of photosensitive material in which a plurality of volume phase holograms is superimposed. A number of parameters and an orientation for the volume phase holograms are calculated such that the holographic resonant system produces a desired behavior. The desired behavior is determined by selecting an angle of incidence, $\theta_{in}$, from a single direction and a wavelength, $\lambda_{playback}$, such that only light beams from angle $\theta_{in}$ having a wavelength $\lambda_{playback}$ illuminate the holographic resonant system. In addition, an angle of reflection $\theta_{out}$ is selected such that light beams also having the wavelength $\lambda_{playback}$ are reflected from the holographic resonant system at angle $\theta_{out}$. The parameters and orientation of the volume phase holograms need not be identical.

A first volume phase hologram selects incoming light from an upper surface of the holographic resonant system having angle of incidence $\theta_{in}$ and wavelength $\lambda_{playback}$ and then internally diffracts it to a second volume phase hologram. The second volume phase hologram accepts the diffracted light from the first hologram and internally diffracts it a second time to form an image that is reflected from the upper surface of the holographic resonant system at angle $\theta_{out}$ having wavelength $\lambda_{playback}$.

In accordance with other aspects of the invention, the light beam diffracted from the first volume phase hologram and the internal light beam incident upon the second volume phase hologram, preferably, lie in both the XY and XZ planes.

In accordance with still other aspects of this invention, instead of the light beam diffracted from the first volume phase hologram and the internal light beam incident upon the second volume phase hologram lying in the both the XY and XZ planes, they lie in only the XZ plane.

In accordance with further other aspects of the invention, the internal light beam diffracted from the first volume phase hologram and the internal light beam incident upon the second volume phase hologram are, preferably, collinear and parallel to the upper surface of the holographic resonant system.

In accordance with further aspects of this invention, instead of the internal light beam diffracted from the first volume phase hologram and the internal light beam incident upon the second volume phase hologram being collinear, they are substantially collinear. Further, instead of the internal light beam diffracted from the first volume phase hologram and the internal light beam incident upon the second volume phase hologram being parallel to the upper surface of the holographic resonant system, they are not parallel to the upper surface of the holographic resonant system.

In accordance with yet further aspects of this invention, instead of including a single layer of photosensitive material having superimposed volume phase holograms, the holographic resonant system includes a plurality of layers of photosensitive material, each layer containing a volume phase hologram, where a first volume phase hologram in a first layer diffracts the incident light into a second hologram in a second layer which then diffracts the light to produce an image reflected from the upper surface of the holographic resonant system.

In accordance with yet other further aspects of this invention, instead of the first volume phase hologram diffracting the incident light directly to the second volume phase hologram, the first volume phase hologram diffracts the incident light beam to either an upper or lower surface of the holographic resonant system, where the diffracted light beam is then totally internally reflected from either the upper or lower surface. The second volume phase hologram then accepts the reflected light beam and further diffracts the light beam to produce an image reflected from the upper surface of the holographic resonant system.

In accordance with yet still other further aspects of this invention, the holographic resonant system also contains an optically transmissive layer laminated to the upper or lower surface of either the single layer of photosensitive material having superimposed volume phase holograms or the multiple layers of photosensitive material, each having a volume phase hologram. In this instance, the first volume phase hologram diffracts the incident light beam to an upper surface of the optically transmissive layer if the optically transmissive layer is laminated to the upper surface of the photosensitive material, or the first volume phase hologram diffracts the incident light beam to a lower surface of the optically transmissive layer if the optically transmissive layer is laminated to the lower surface of the photosensitive material. Then, the light beam is totally internally reflected from either the upper or lower surface of the optically transmissive layer. The second volume phase hologram then accepts the reflected light beam and further diffracts the light beam to produce an image reflected from the upper surface of the holographic resonant system.

In accordance with even further aspects of this invention, instead of reflecting a point source of light from the holographic resonant system, a three-dimensional image created from either an actual three-dimensional object or from a master hologram which projects a three-dimensional image of an object can be reflected from the upper surface of the holographic resonant system.

In accordance with even further other aspects of this invention, if angles $\theta_{in}$ and $\theta_{out}$ are not equivalent, there are two variations of the optical structure of the holographic resonant system, an obtuse embodiment and an acute embodiment.

In accordance with yet even further other aspects of this invention, the photosensitive material is, preferably, a photopolymer film. Alternatively, the photosensitive material is dichromated gelatin.

As will be readily appreciated from the foregoing description, by superimposing volume phase holograms or by layering volume phase holograms, only light that satisfies the conditions for all of the volume phase holograms (Bragg gratings) will illuminate the holographic resonant system, thus narrowing the acceptable illumination angles. By narrowing the illumination angles, light outside of the desired angle of incidence (illumination) will not illuminate the system. Thus, the system of the present invention creates images with more contrast and clarity.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a holographic resonant system that has a very narrow illumination angle range, thus making the system more insensitive to ambient light and thus creating sharper images.

As will be better understood from the following discussions, the holographic resonant system consists of a processed photosensitive material, typically a processed photosensitive film, in which multiple volume phase holograms have been exposed. Only incident light beams that satisfy the conditions for all of the volume phase holograms will illuminate the holographic resonant system. In practice, these conditions are predetermined and the photosensitive material is exposed according to these conditions in order to produce the desired holographic resonant system.

Figure 1:
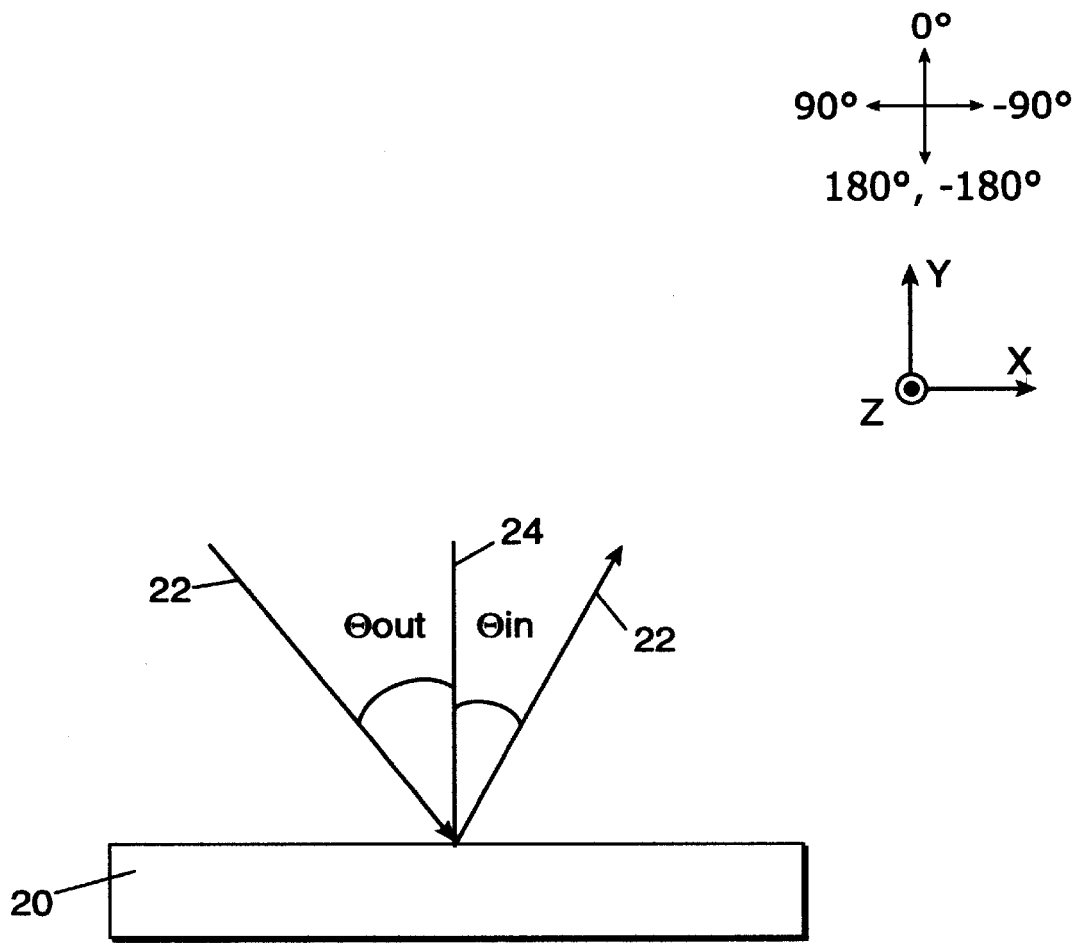
FIG. 1 is a schematic diagram of a holographic resonant system formed in accordance with the invention showing an incident and reflected light beam from that system.

FIG. 1 is a schematic diagram illustrating the operation of a holographic resonant system 20 of the present invention. The holographic resonant system 20 receives an incident light beam 22 having a desired wavelength Of $\lambda_{playback}$ at an angle of $\theta_{in}$ in the XY plane. The angle $\theta_{in}$ represents the desired illumination angle of the holographic resonant system. Light received at angles outside of the XY plane and angles deviating from $\theta_{in}$ will not substantially illuminate the holographic resonant system.

The holographic resonant system 20 reflects the light beam 22 having a wavelength of $\lambda_{playback}$ at an angle of $\theta_{out}$ in the XY plane. Angle $\theta_{out}$ represents the desired viewing angle of the holographic resonant system.

After choosing the desired $\theta_{in}$, $\theta_{out}$ and $\lambda_{playback}$, the holographic resonant system 20 is formed by exposing two volume phase holograms on a single, layer of photosensitive material in accordance with a plurality of parameters needed to produce the desired resonant system behavior as shown in FIG. 1. The preferred photosensitive material is a photopolymer film, such as Dupont photopolymer HRF 700x001-20. In general, the holographic resonant system 20 consists of two superimposed volume phase holograms, which function together as a single system. For purposes of this discussion, the effects of the two volume phase holograms are discussed individually.

Figure 2:
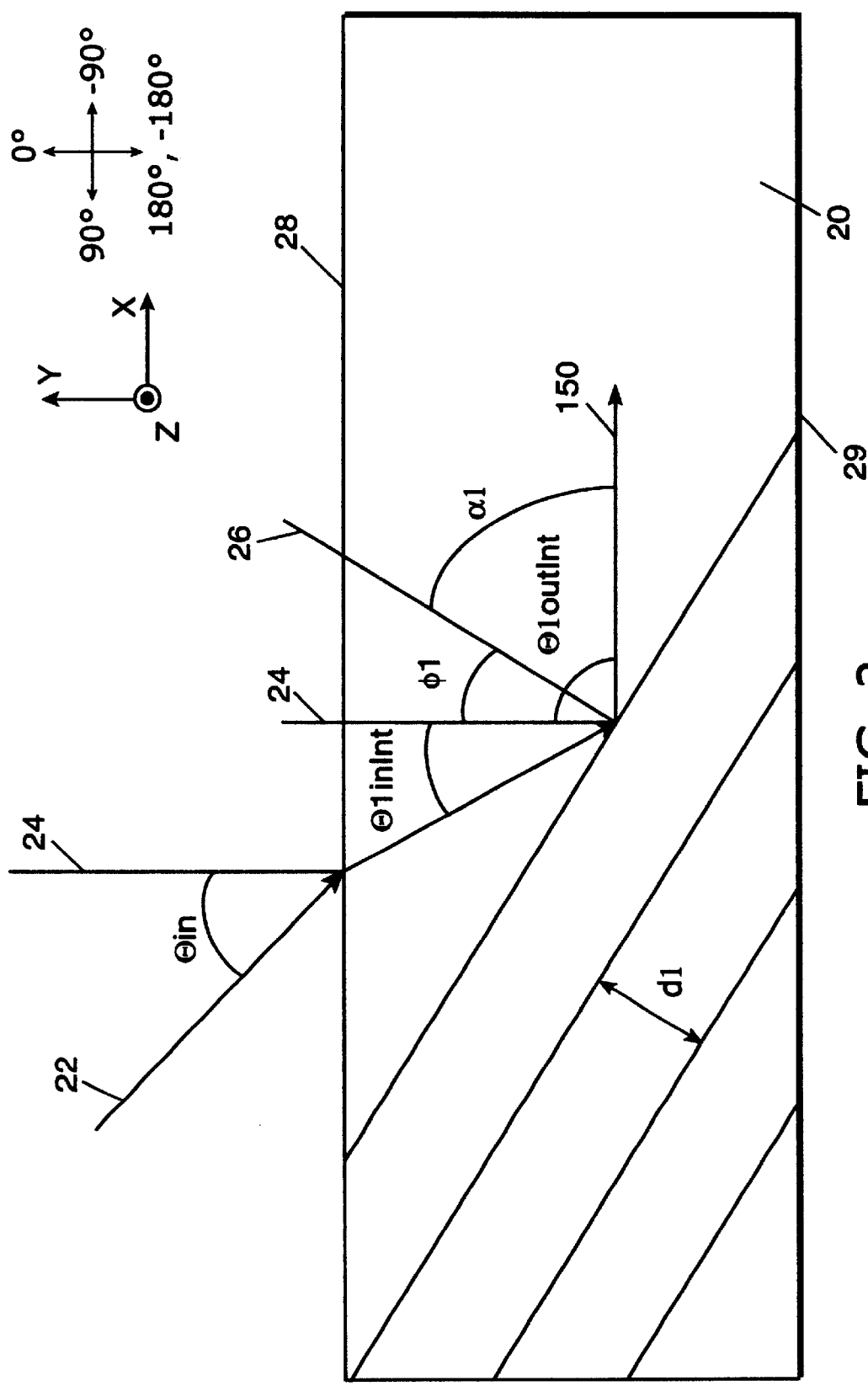
FIG. 2 is a schematic diagram of a holographic resonant system formed in accordance with the present invention that illustrates the initial internal behavior of an incident light beam.
Figure 3:
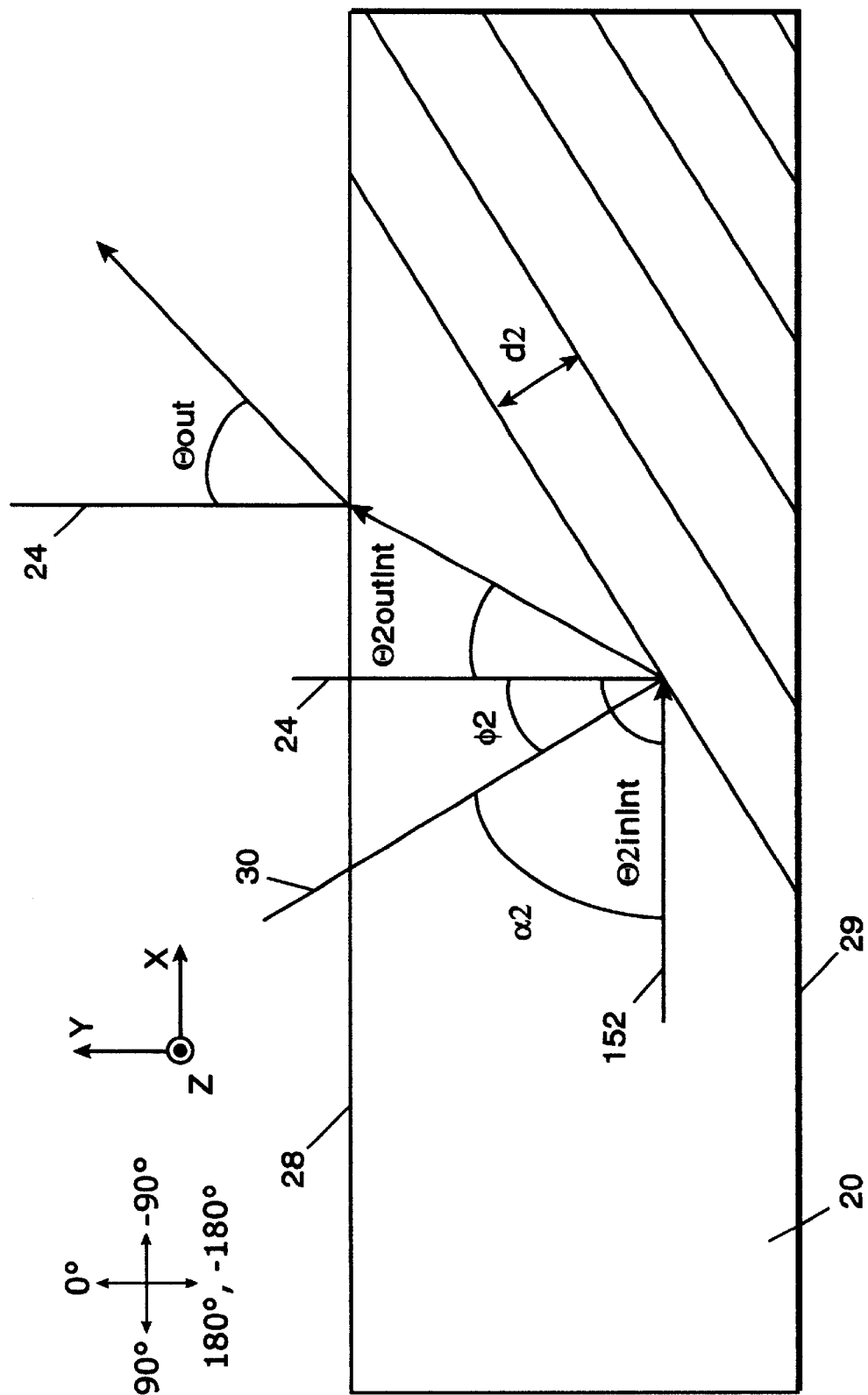
FIG. 3 is a schematic diagram of a holographic resonant system formed in accordance with the present invention that illustrates the subsequent internal behavior of an internal light beam.

The two volume phase holograms each contain a plurality of Bragg planes, which are typical of volume phase holograms. FIGS. 2 and 3 are schematic diagrams illustrating the internal behavior of the holographic resonant system 20. In particular, FIG. 2 illustrates the internal behavior with respect to the function of a first volume phase hologram, while FIG. 3 illustrates the internal behavior with respect to the function of a second volume phase hologram. In designing the holographic resonant system 20, given $\theta_{in}$, $\theta_{out}$ and $\lambda_{playback}$, the following variables, also shown in FIGS. 2 and 3, need to be determined:

$\theta_{1inInt}$=internal angle of incidence of first volume phase hologram.

$\theta_{1outInt}$=internal angle of diffraction of first volume phase hologram.

$\theta_{2inInt}$=internal angle of incidence of second volume phase hologram.

$\theta_{2outInt}$=internal angle of diffraction of second volume phase hologram.

$\phi_1$=Bragg plane normal angle corresponding to first volume phase hologram.

$\phi_2$=Bragg plane normal angle corresponding to second volume phase hologram.

$\alpha_1$=angle between $\theta_{1outInt}$ and Bragg plane normal of the first volume phase hologram.

$\alpha_2$=angle between $\theta_{2inInt}$ and Bragg plane normal of the first volume phase hologram.

$d_1$=Bragg plane distance corresponding to first volume phase hologram.

$d_2$=Bragg plane distance corresponding to second volume phase hologram.

In operation, the incident light beam 22 enters an upper surface 28 of the holographic resonant system 20 at angle $\theta_{in}$ (shown in FIG. 2) and exits the upper surface 28 at angle $\theta_{out}$ (shown in FIG. 3). Both angles, $\theta_{in}$ and $\theta_{out}$, are measured in reference to a holographic resonant system normal vector 24 that is perpendicular to the upper surface 28. The light beam 22 experiences refraction both upon entering and exiting upper surface 28 since the index of refraction of the film is different than the index of refraction of air. Therefore, from Snell's Law, an internal input angle, $\theta_{inInt}$, shown in FIG. 2, and an internal output angle, $\theta_{2outInt}$, shown in FIG. 3, are calculated according to the equations:

$$\theta_{1inInt} = \text{Arc sin}((n_{air} \sin \theta_{in})/n_{filmproc}) \quad (1)$$

$$\theta_{2outInt} = \text{Arc sin}((n_{air} \sin \theta_{out})/n_{filmproc}) \quad (2)$$

In these equations, $n_{filmproc}$ is the index of refraction of the film for $\lambda_{playback}$ after processing and $n_{air}$ is the index of refraction of air.

As FIG. 2 further illustrates, the internal effect of the first volume phase hologram is to select incoming light of a desired wavelength $\lambda_{playback}$ and direction $\theta_{1inInt}$ corresponding to $\theta_{in}$, and then diffract the light beam in the XY plane from $\theta_{1inInt}$ to an angle of diffraction $\theta_{1outInt}$ that is −90 degrees in the preferred embodiment. Similarly, as FIG. 3 illustrates, the internal effect of the second volume phase hologram is to diffract light in the XY plane from a second internal angle of incidence $\theta_{2inInt}$ that is 90 degrees in the preferred embodiment to a second internal angle of diffraction $\theta_{2outInt}$. In combination, the overall effect of the holographic resonant system having two superimposed volume phase holograms is that the first volume phase hologram selects incoming light and directs it to the second volume phase hologram which redirects the light to form an outgoing image.

In order to produce the desired behavior, the parameters $\phi_1$, $\alpha_1$, $d_1$, $\phi_2$, $\alpha_2$, and $d_2$ corresponding to the necessary orientations of the two sets of Bragg planes are determined using the following equations:

$$\alpha_1 = ((\theta_{1inInt} - \theta_{1outInt})/2) \tag{3}$$

$$\alpha_2 = ((\theta_{2inInt} - \theta_{2outInt})/2) \tag{4}$$

$$\phi_1 = \theta_{1inInt} - \alpha_1 \tag{5}$$

$$\phi_2 = \theta_{2inInt} - \alpha_2 \tag{6}$$

$$d_1 = \lambda_{playback}/(2n_{filmproc} \cos \alpha_1) \tag{7}$$

$$d_2 = \lambda_{playback}/(2n_{filmproc} \cos \alpha_2) \tag{8}$$

As shown in equations 7 and 8, the Bragg plane distances, $d_1$ and $d_2$, are calculated using Bragg's Law where $\alpha$ is the angle between the input angle and the Bragg plane normal, and $\lambda_{playback}$ is the wavelength of light that this system is designed to playback.

Although the parameters of the desired holographic resonant system behavior are now determined using the above formulas in conjunction with the desired angles $\theta_{in}$ and $\theta_{out}$ and wavelength $\lambda_{playback}$ of the light beam 22, the film can shrink or expand during processing which changes the plane angles and the Bragg plane distances. Therefore, a shrink factor, $f_{shr}$, is assumed in order to compensate for these changes. This shrink factor, $f_{shr}$, approximates the ratio of the thickness of the photosensitive layer after processing to the thickness of the same photosensitive layer before exposure. The following equations are used to recompute the new angles and distances:

$$\phi_{1s} = \text{Arc tan}(\tan \phi_1/f_{shr}) \tag{9}$$

$$\phi_{2s} = \text{Arc tan}(\tan \phi_2/f_{shr}) \tag{10}$$

$$d_{1s} = d_1 \sin \phi_{1s}/\sin \phi_1 \tag{11}$$

$$d_{2s} = d_2 \sin \phi_{2s}/\sin \phi_2 \tag{12}$$

It will be readily appreciated by those skilled in the art that although the Bragg planes shown within the holographic resonant system 20 in FIGS. 2 and 3 are oriented and depicted such that the light beams incident upon, diffracted within and reflected from the holographic resonant system all lie in the XY plane, the light beams defining and corresponding to angles $\theta_{in}$, $\theta_{2inInt}$, $\theta_{1outInt}$, and $\theta_{out}$ need not be coplanar for the resonant system to function. The preferred system can function as long as the light beams defined by and corresponding to the angles $\theta_{2inInt}$ and $\theta_{1outInt}$ are substantially collinear. The Bragg planes and thus the parameters corresponding to the orientation of these Bragg planes can be altered such that the internal light beams corresponding to angles $\theta_{1outInt}$ and $\theta_{2inInt}$ lie only in the XZ plane rather than both the XY plane and the XZ plane. The overall exterior effect of the holographic resonant system remains substantially the same in that light beams from angle $\theta_{in}$ in the XY plane will illuminate the system and be reflected at angle $\theta_{out}$ also in the XY plane. However, internally, the light beam diffracted from the first volume phase hologram and the light beam incident upon the second volume phase hologram lie only in the XZ plane rather than both the XY plane and the XZ plane.

This effect can best be illustrated in top and side views of the holographic resonant system as shown in FIGS. 8A and 8B and FIGS. 9A and 9B, where the top is defined by surface 28 of the holographic resonant system 20. FIGS. 8A, 8B, 9A and 9B illustrate four vectors applied to the holographic resonant system 20. For ease of illustration, vector a represents both the light beam incident upon the system and the light beam internally incident upon the first volume phase hologram, and vector d represents the light beam internally diffracted from the second volume phase hologram and the light beam reflected from the holographic resonant system. Vector b represents the light beam internally diffracted from the first volume phase hologram, and vector c represents the light beam internally incident upon the second volume phase hologram.

Figure 8A:
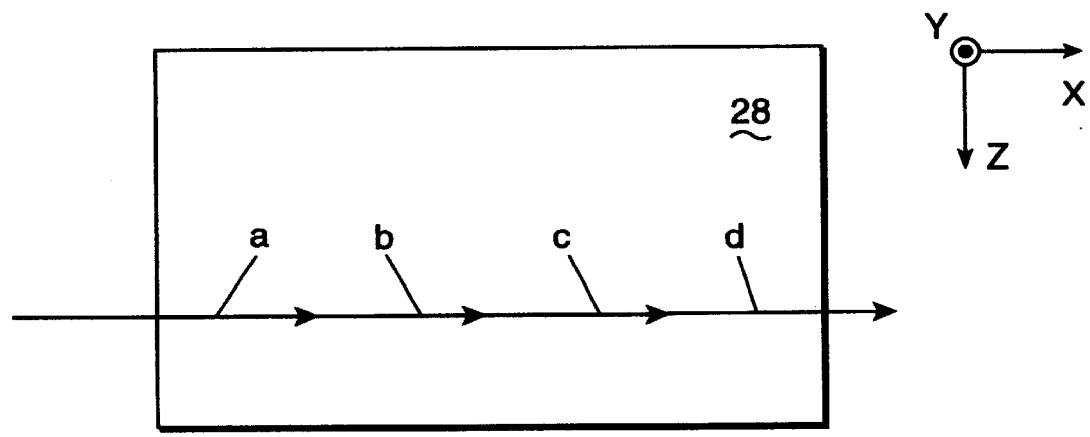
FIG. 8A is a top view of the holographic resonant system of the present invention showing light beams applied to and within the holographic resonant system in a single plane.
Figure 8B:
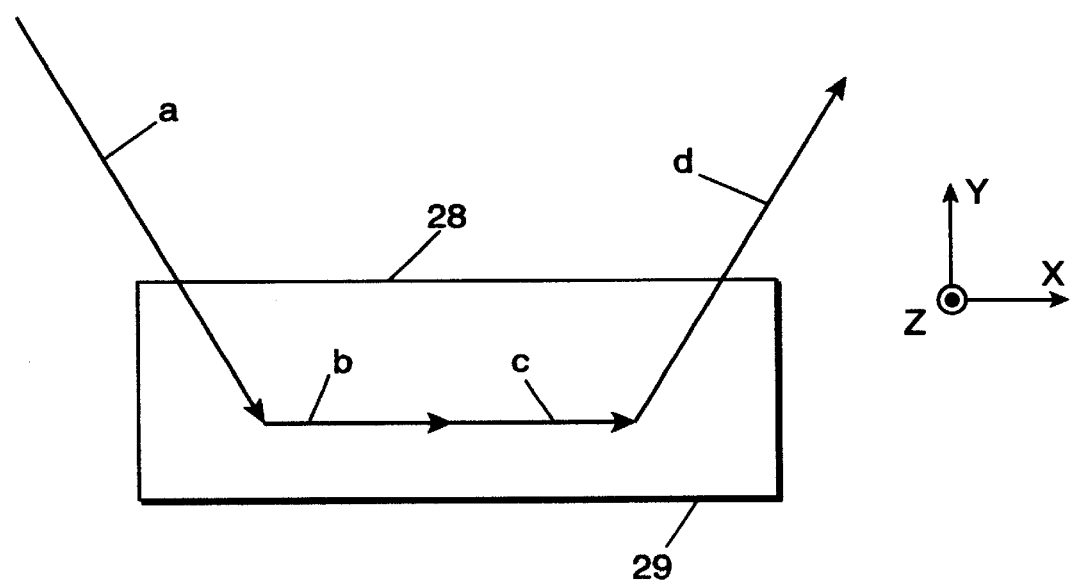
FIG. 8B is a side view of the holographic resonant system of the present invention showing light beams applied to and within the holographic resonant system in a single plane.

FIGS. 8A and 8B illustrate two-dimensional top and side views, respectively, where the light beams all lie in the XY plane. As shown in the top view in FIG. 8A, vectors a, b, c, and d all visually appear to lie in a straight line. From the side view as shown in FIG. 8B, vectors a and d enter and exit the film at surface 28, while vectors b and c are within the film and lie in both the XY plane and the XZ plane.

Figure 9A:
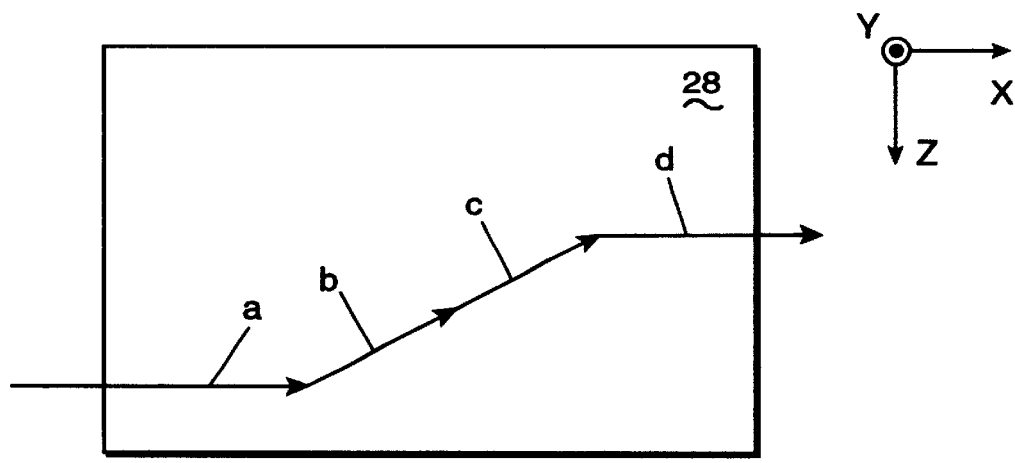
FIG. 9A is a top view of an alternative holographic resonant system showing light beams applied to and within the holographic resonant system in two planes.
Figure 9B:
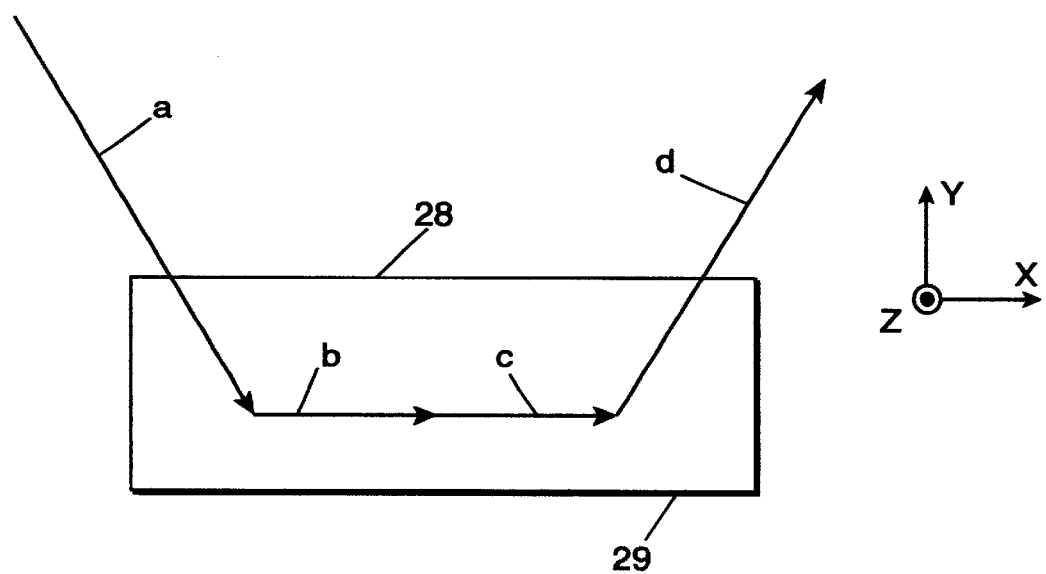
FIG. 9B is a side view of the alternative holographic resonant system, shown in FIG. 9A, showing light beams applied to and within the holographic resonant system in two planes.

FIGS. 9A and 9B illustrate two-dimensional top and side views, respectively, of a holographic resonant system where the light beams do not all lie in the XY plane. In this instance, the orientation of the Bragg planes has been altered such that the light beams internally diffracted from the first volume phase hologram, vector b, and incident upon the second volume phase hologram, vector c, are only in the XZ plane and remain substantially collinear. From the two-dimensional side view shown in FIG. 9B, this case visually appears identical to the side view shown in FIG. 8B where all the light beams in fact lie in the XY plane. However, from the top view shown in FIG. 9A, vectors a, b, c, and d do not lie in a straight line as in FIG. 8A. Rather, vectors b and c deviate from vector a which vertically enters the system and vector d which vertically exits the system, thus showing vectors b and c lie in a separate plane from vectors a and d that are parallel to the XY plane.

Returning to the preferred case in which the light beams all lie in a single plane, after making the calculations set forth in equations 9 through 12, the parameters for the desired holographic resonant system behavior are known. Theoretically, using basic reflection holographic techniques, the two superimposed holograms could be recorded with beams oriented to angles of approximately $\theta_{1inInt}$ and 90 degrees for the first hologram and approximately −90 degrees and $\theta_{2outInt}$ for the second hologram. However, it is difficult to record a hologram with one beam at either 90° or −90. Therefore, a different wavelength of light than the playback wavelength is used for recording. This allows the recording of holograms with the required Bragg distances and plane angles with beams that are not at 90° or −90°. Induced shrinkage or swelling of the photosensitive material, which changes $f_{shr}$, can also be used to enable the recording of the holograms with the required characteristics. The recording angles for the first hologram can be calculated using Bragg's law and the following equations using a given recording wavelength, $\lambda_{record1}$, and the index of refraction of the film at exposure, $n_{expose}$:

$$\alpha_{1record} = \text{Arc} \cos(\lambda_{record1}/(2n_{expose} d_{1s}))*|\alpha_1|/\alpha_1 \tag{13}$$

$$\theta_{1recInInt} = ((\phi_{1s} + \alpha_{1record} + 180) \mod 360) - 180 \tag{14}$$

$$\theta_{1recOutInt} = ((\phi_{1s} - \alpha_{1record}) \mod 360) - 180 \tag{15}$$

The recording angles for the second hologram can be calculated using Bragg's law and the following equations using a given recording wavelength, $\lambda_{record2}$, and the index of refraction of the film at exposure, $n_{expose}$:

$$\alpha_{2record} = \text{Arc}\cos(\lambda_{record2}/(2n_{expose}d_{2s})*|\alpha_2|/\alpha_2 \quad (16)$$

$$\theta_{2recInInt} = ((\phi_{2s} + \alpha_{2record})\bmod 360) - 180 \quad (17)$$

$$\theta_{2recOutInt} = ((\phi_{2s} - \alpha_{2record} + 180)\bmod 360) - 180 \quad (18)$$

In one typical example given $\theta_{in}=30°$, $\theta_{out}=0°$, $\theta_{2inInt}=90°$, $\theta_{1outInt}=-90°$, $f_{shr}=0.96$, $\lambda_{playback}=532$ nm (green light), $\lambda_{record1}=488$ nm (blue-green light), $\lambda_{record2}=488$ nm (blue-green light), $n_{filmproc}=1.522$, $n_{air}=1.000$, and $n_{expose}=1.493$, the calculations result in $\theta_{1recInInt}=21.6°$, $\theta_{1recOutInt}=85.3°$, $\theta_{2recInInt}=-84.2°$, $\theta_{2recOutInt}=-3.4°$.

Since $\theta_{1recOutInt}$ and $\theta_{2recInInt}$ are still both greater than the critical angle for the film, the film is index matched, using xylene, to a prism in order to couple the recording light beams into the film. In addition, a light-absorbing plate made of clear red acrylic is index matched, also using xylene, to the back of the film to reduce interference from reflections off of a lower surface 29 of the film 20.

Figure 4:
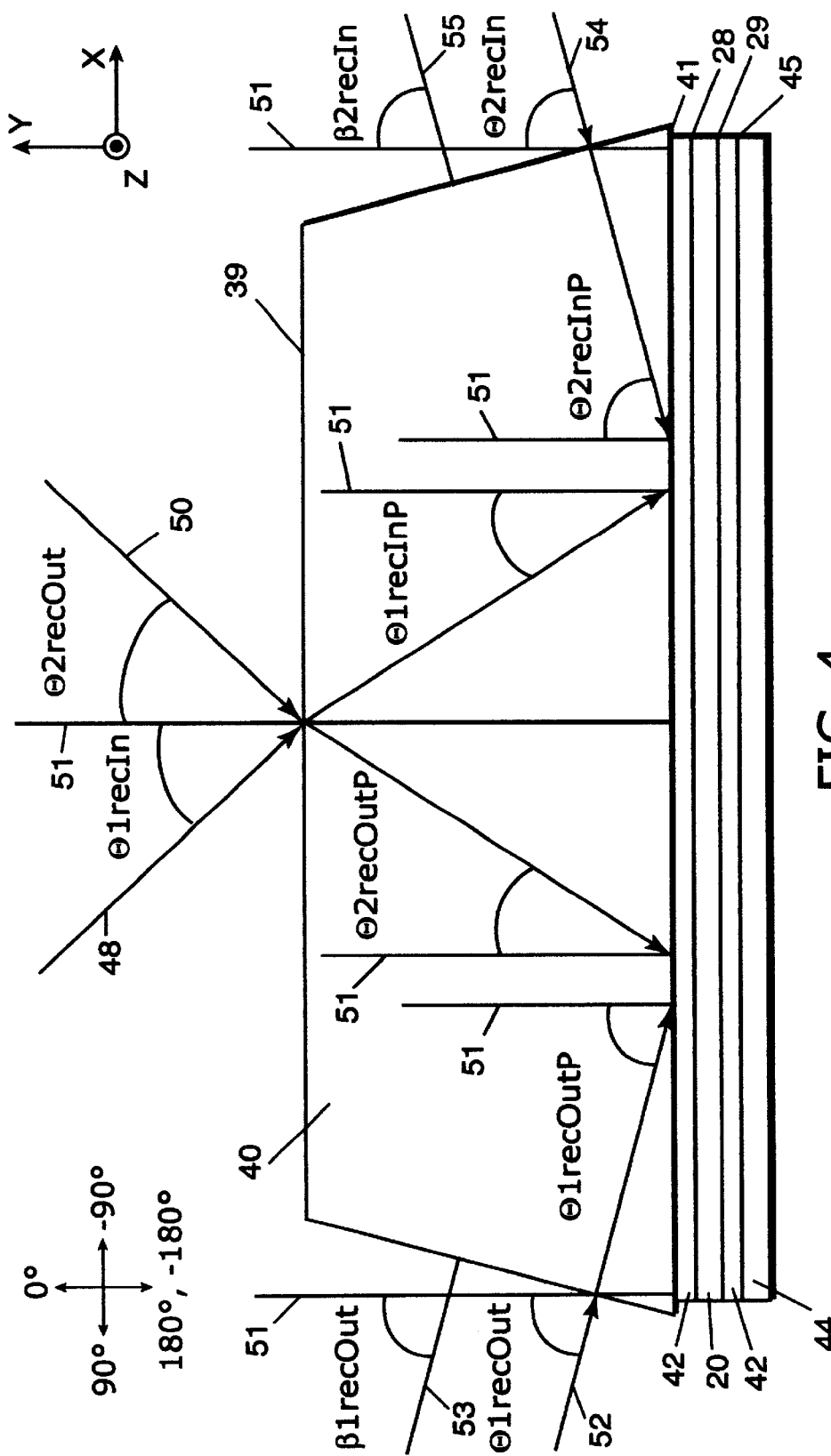
FIG. 4 is a cross sectional view of a portion of a mechanism for creating the holographic resonant system of the present invention.

FIG. 4 is a schematic diagram illustrating, in part, the film 20 having upper surface 28 and lower surface 29, a prism 40 having an upper surface 39 and lower surface 41, a light absorber 44 having an upper surface 45, and a plurality of xylene index matching layers 42. As shown in FIG. 4, the upper surface 28 of film 20 is secured and index matched via an index matching layer 42 to the lower surface 41 of prism 40. Then, the upper surface 45 of light absorber 44 is secured and index matched via another index matching layer 42 to the lower surface 29 of film 20.

Next, a plurality of angles, $\theta_{1recIn}$, $\theta_{1recOut}$, $\theta_{2recIn}$ and $\theta_{2recOut}$, measured with respect to a normal 51 of lower surface 41 of prism 40, shown in FIG. 4, are calculated according to equations 19 through 26, set forth below, to correspond respectively to $\theta_{1recInInt}$, $\theta_{1recOutInt}$, $\theta_{2recInInt}$ and $\theta_{2recOutInt}$. For reference, prism normal vector 51 represents 0 degrees. In order to calculate the angles and positions of the light beams required to create the holographic resonant system, the angles of the light beams within the prism, $\theta_{1recInP}$, $\theta_{1recOutP}$, $\theta_{2recInP}$ and $\theta_{2recOutP}$, are first determined. The following equations derived from Snell's Law are used to calculate angles of the light beams within the prism:

$$\theta_{1recInP} = \text{Arc}\sin((n_{expose}\sin\theta_{1recInInt})/n_{prism}) \quad (19)$$

$$\theta_{1recOutP} = \text{Arc}\sin((n_{expose}\sin\theta_{1recOutInt})/n_{prism}) \quad (20)$$

$$\theta_{2recInP} = \text{Arc}\sin((n_{expose}\sin\theta_{2recInInt})/n_{prism}) \quad (21)$$

$$\theta_{2recOutP} = \text{Arc}\sin((n_{expose}\sin\theta_{2recOutInt})/n_{prism}) \quad (22)$$

Next, the angles of the light beams within the prism are used to determine which face of the prism the light beam will enter. For each angle of a light beam within the prism, $\theta_{1recInP}$, $\theta_{1recOutP}$, $\theta_{2recInP}$ and $\theta_{2recOutP}$, the face whose normal angle is closest to the angle of that light beam within the prism is selected. For instance, if $\theta_{1recOutp}=78.6°$ then the face with a normal angle of 80° would be selected and the value of a face angle $\beta_{1recOut}$ would be 80°. A plurality of face normal angle values, $\beta_{1recIn}$, $\beta_{1recOut}$, $\beta_{2recIn}$ and $\beta_{2recOut}$, are used in conjunction with the light beam angles within the prism, $\theta_{1recInP}$, $\theta_{1recOutP}$, $\theta_{2recInP}$ and $\theta_{2recOutP}$, to calculate the external exposure angles, $\theta_{1recIn}$, $\theta_{1recOut}$, $\theta_{2recIn}$ and $\theta_{2recOut}$, using the following equations:

$$\theta_{1recIn} = \beta_{1recIn} - \text{Arc}\sin((n_{prism}\sin(\beta_{1recIn}-\theta_{1recInP})/n_{air}) \quad (23)$$

$$\theta_{1recOut} = \beta_{1recOut} - \text{Arc}\sin((n_{prism}\sin(\beta_{1recOut}-\theta_{1recOutP})/n_{air}) \quad (24)$$

$$\theta_{2recIn} = \beta_{2recIn} - \text{Arc}\sin((n_{prism}\sin(\beta_{2recIn}-\theta_{2recInP})/n_{air}) \quad (25)$$

$$\theta_{2recOut} = \beta_{2recOut} - \text{Arc}\sin((n_{prism}\sin(\beta_{2recOut}-\theta_{2recOutP})/n_{air}) \quad (26)$$

Continuing the previous example since $\theta_{1recInInt}=21.6°$, $\theta_{1recOutInt}=85.3°$, $\theta_{2recInInt}=-84.2°$, $\theta_{2recOutInt}=-3.4$, $\beta_{1recIn}=0°$, $\beta_{1recOut}=80°$, $\beta_{2recIn}=-80°$, and $\beta2recOut=0°$. With $n_{prism}=1.495$, the exposure angles are $\theta_{1recIn}=33.4°$, $\theta_{1recOut}=86.7°$, $\theta_{2recIn}=-85.3°$, and $\theta_{2recOut}=-5.1°$.

Finally, from using the above equations in conjunction with the desired angles $\theta_{in}$ and $\theta_{out}$ and wavelength $\lambda_{playback}$ of the light beam 22, the parameters of the desired holographic resonant system behavior are determined, and the angles used to record the two holograms, $\theta_{1recIn}$, $\theta_{1recOut}$, $\theta_{2recIn}$ and $\theta_{2recOut}$, which are depicted in FIG. 4, are used to produce the desired holographic resonant system.

Figure 5:
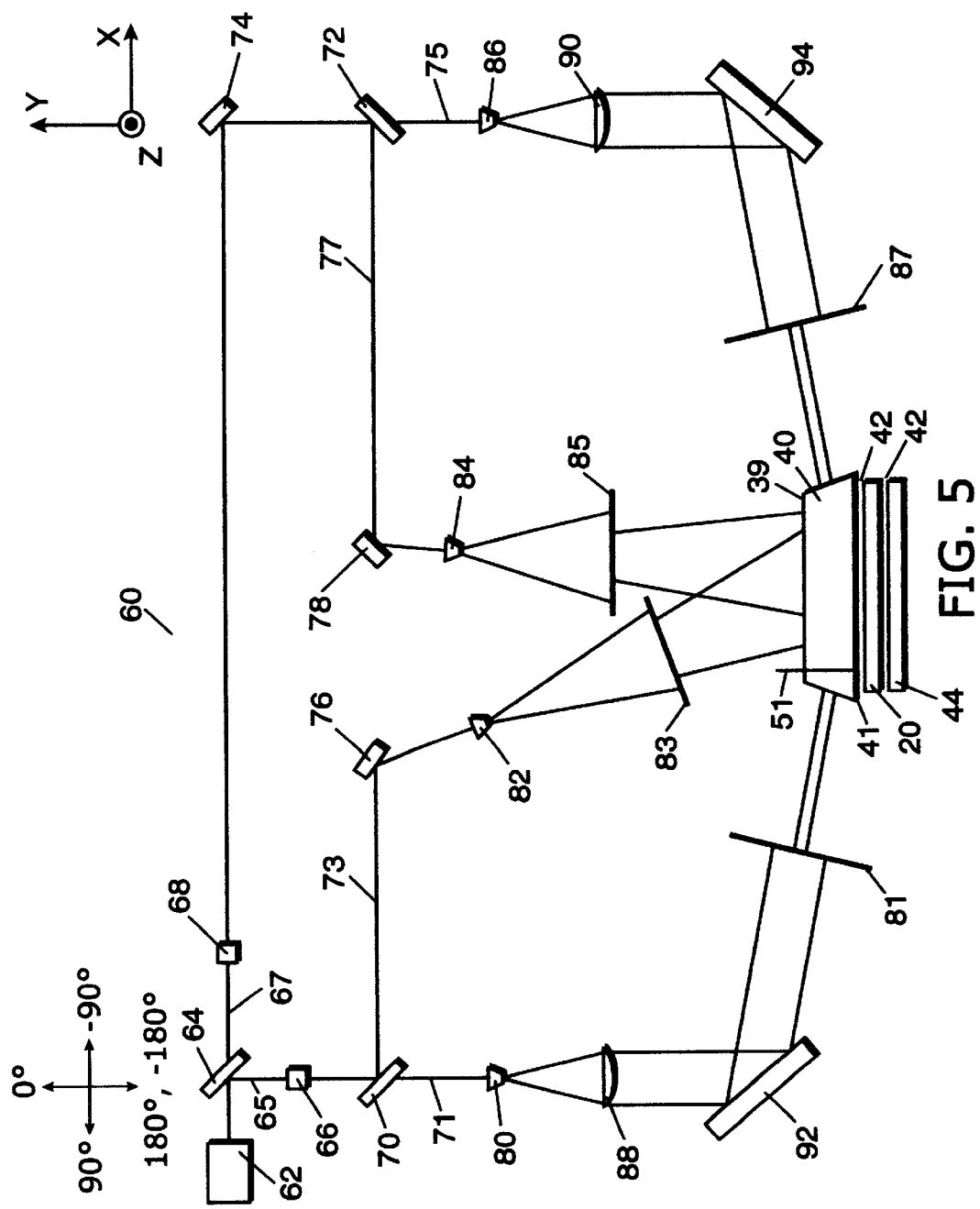
FIG. 5 illustrates an apparatus for creating a holographic resonant system of the present invention.

FIG. 5 shows a schematic diagram of an apparatus 60 for manufacturing the holographic resonant system by exposing two volume phase holograms on a single layer of photosensitive film. From the previous steps, all of the variables of the desired holographic resonant system have been determined. Generally, the manufacturing process involves using two sets of beams of coherent light. Each set produces one of the holograms in the two-hologram resonant system.

In the preferred embodiment, the manufacturing apparatus 60 should be utilized on a vibration free optical table. The manufacturing apparatus 60 includes a laser 62, a 50–50 beamsplitter 64, a plurality of variable beamsplitters 70 and 72, a plurality of shutters 66 and 68, a plurality of mirrors 74, 76, 78, 92 and 94, a plurality of spatial filters 80, 82, 84 and 86, a plurality of rectangular apertures 81, 83, 85 and 87, a plurality of collimating lenses 88 and 90, prism 40, film 20, light absorber 44, and xylene index matching layers 42.

Again, as noted above, the normal 51 to the lower surface 41 of prism 40 represents 0 degrees and angles to the left of the normal are positive, while angles to the right are negative. Continuing with the previous example, where the exposure angles are $\theta_{1recIn}=33.4°$, $\theta_{1recOut}=86.7°$, $\theta_{2recIn}=-85.3°$, and $\theta_{2recOut}=-5.1°$ the manufacturing apparatus 60 is set up such that the laser 62 emits a laser beam at −90° and applies this laser beam to 50–50 beamsplitter 64 producing light beams 65 and 67. Beamsplitter 64 then applies the resulting light beam 65 to shutter 66 at 180° and the second resulting light beam 67 to shutter 68 at −90°. Next, shutter 66 applies light beam 65 to variable beamsplitter 70 at 180°, which in turn splits light beam 65 into light beams 71 and 73. Light beam 71 is applied to spatial filter 80 at 180°, which in turn applies light beam 71 to collimating lens 88 at 180°. Mirror 92 is set up relative to the collimating lens 88 and prism 40 such that the mirror accepts light beam 71 at 0° and reflects it such that light beam 71 forms angle $\theta_{recOut}=86.7°$ with respect to prism normal 51 after passing through rectangular aperture 81. Meanwhile, light beam 73 is applied to mirror 76 at −90°. Mirror 76 is positioned such that it accepts light beam 73 at 90° from variable beamsplitter 70 and reflects light beam 73 such that light beam 73 forms angle $\theta_{1recIn}=33.4°$ with respect to normal 51 after passing through spatial filter 82 and rectangular aperture 83.

While shutter 66 controls and directs light beam 65, shutter 68 controls and directs light beam 67 at −90° to mirror 74. Mirror 74 is oriented such that it accepts light beam 67 at 90° and reflects it at 180° to variable beamsplitter 72. Variable beamsplitter 72 splits light beam 67 into light beams 75 and 77. Light beam 75 is applied to spatial filter 86 at 180°, which in turn applies light beam 75 to collimating lens 90 at 180°. Mirror 94 is set up relative to the collimating lens 90 and prism 40 such that the mirror accepts light beam 75 at 0° and reflects it such that light beam 75 forms angle $\theta_{2recIn}=-85.3°$ with respect to normal 51 after passing through rectangular aperture 87. Meanwhile, light beam 77 is applied to mirror 78 at 90°. Mirror 78 is positioned such that it accepts light beam 77 at −90° from variable beamsplitter 72 and reflects light beam 77 such that light beam 77 forms angle $\theta_{2recOut}=-5.1°$ with respect to normal 51 after passing through spatial filter 84 and rectangular aperture 85.

All of the light beams must strike the same area of the photosensitive film after passing through the prism in order to form the two superimposed holograms. The sizes and positions of rectangular apertures 81, 83, 85 and 87 are adjusted so that the beams all fill the same rectangular area on the photosensitive film. These apertures minimize noise by blocking stray light that can scatter from the edges of the film plate and prism.

For one skilled in the art, it is apparent that the angles of the light beams can easily be varied within certain ranges by changing the positions and orientations of mirrors 76, 78, 92 and 94, rectangular apertures 81, 83, 85 and 87, and spatial filters 82 and 84. Also, prism 40 can be interchanged with other prisms having different face angles and thicknesses for even more flexibility. This flexibility allows this setup to be used to create a variety of different holographic resonant systems with varying exposure angles, $\theta_{1recIn}$, $\theta_{1recOut}$, $\theta_{2recIn}$ and $\theta_{2recOut}$.

Before operating the manufacturing apparatus 60 and exposing the film 20, exposure parameters of the apparatus 60 are determined and adjusted. To do so, the laser 62 is applied to 50–50 beamsplitter 64. Then, shutter 66 is opened while keeping shutter 68 closed. While shutter 66 is open, the variable beamsplitter 70 is adjusted so that the ratio of the energies of the resulting light beams 71 and 73 reaching the film 20 is 1:1. Next, shutter 66 is closed, and shutter 68 is opened. Beamsplitter 72 is then adjusted so the ratio of the energies of the resulting light beams 75 and 77 reaching the film 20 is also 1:1. Now, the exposure time for each shutter is determined from the film speed and the beam power measured at the film 20 when each shutter is open individually by using the following equations:

$$\text{time}_{shutter66}=\text{energy}_{ReqExposure}/2/\text{power}_{measured66open} \quad (27)$$

$$\text{time}_{shutter68}=\text{energy}_{ReqExposure}/2/\text{power}_{measured68open}. \quad (28)$$

In order to make the exposure, one shutter at a time should be opened. When using Dupont photopolymer HRF 700x001-20, the preferred film, the total exposure time should be divided into approximately twenty periods and the shutters should be alternated. This is due to the particular characteristics of photopolymers, which use chemical diffusion for index modulation.

An example of the exposure sequence which corresponds to the Dupont photopolymer HRF 700x001-20 where $\text{energy}_{ReqExposure}=15 \text{ mJ/cm}^2$ $\text{power}_{measured66open}=1 \text{ mW/cm}^2$ $\text{power}_{measured68open}=0.5 \text{ mW/cm}^2$ $\text{time}_{shutter66}=7.5 \text{ sec}$ $\text{time}_{shutter68}=15 \text{ sec}$ $\text{period}_{shutter66}=0.375 \text{ sec}$ $\text{period}_{shutter68}=0.75 \text{ sec}$ is shown as follows:
1. Open shutter 66 for $\text{period}_{shutter66}$.
2. Open shutter 68 for $\text{period}_{shutter68}$.
3. Open shutter 66 for $\text{period}_{shutter66}$.
4. Open shutter 68 for $\text{period}_{shutter68}$.
5. Open shutter 66 for $\text{period}_{shutter66}$.
6. Open shutter 68 for $\text{period}_{shutter68}$.
39. Open shutter 66 for $\text{period}_{shutter66}$.
40. Open shutter 68 for $\text{period}_{shutter68}$.

Once the calculated values for $\text{period}_{shutter66}$ and $\text{period}_{shutter68}$ have been determined, the optimal exposure time can be determined by making test exposures using multiples and fractions of the calculated values. To expose a hologram, the unexposed film 20 is index matched using xylene to the prism 40, and the light absorbing plate 44 is index matched to the unexposed film 20. After the film 20 is loaded, the table and components are allowed time to settle. This settling time depends on the vibration characteristics of the optics and the stability of the table and the environment. Next the exposure sequence of alternating shutters is run. Finally, after the film is exposed, the film is processed in the conventional manner, creating the desired holographic resonant system.

For one skilled in the art, it is apparent that many changes can be made to the manufacturing apparatus 60 without departing from the scope of the invention. For example, the manufacturing apparatus can be set up in numerous ways such that it ultimately applies two sets of two light beams on prism 40 at the desired angles $\theta_{1recIn}$, $\theta_{1recOut}$, $\theta_{2recIn}$ and $\theta_{2recOut}$. Furthermore, for different films, the number of periods required for exposing the film may vary and thus the number of times the shutters need to be alternated varies as well.

In the preferred embodiment, the angles $\theta_{1outInt}$ and $\theta_{2inInt}$ satisfy the equation $\theta_{1outInt}=\theta_{2inInt}-180°$. This means that the vectors, $v_{1outInt}$ 150 and $v_{2inInt}$ 152, that correspond to these angles are collinear. Since the second hologram in the preferred embodiment, shown in FIGS. 1–3, accepts light from a range of angles around the vector $v_{2inInt}$ 152 and the first hologram diffracts light in a range of angles around the vector $v_{1outInt}$ 150, $v_{2inInt}$ 152 and $v_{1outInt}$ 150 do not need to be perfectly collinear for light to pass through the system. The parameters for an example of an alternative embodiment of a resonant system with superimposed holograms where the vectors corresponding to the angles $\theta_{1outInt}$ and $\theta_{2inInt}$ are substantially, but not perfectly, collinear are shown below:

For parameters:
$\theta_{in}=30°$ $\theta_{out}=0°$ $\theta_{1outInt}=-90°$ $\theta_{2inInt}=89°$ $f_{shr}=0.96$
$\lambda_{playback}=532$ nm $\lambda_{record1}=488$ nm $\lambda_{record2}=488$ nm
$n_{filmproc}=1.522$ $n_{air}=1.000$ $n_{expose}=1.493$ $n_{prism}=1.495$
$\beta_{1recIn}=°$ $\beta_{1recOut}=80°$ $\beta_{2recIn}=-80°$ $\beta_{2recOut}=0°$
The calculations using equations 1–26 result in:
$\theta_{1recIn}=33.4°$ $\theta_{1recOut}=86.7°$ $\theta_{2recIn}=-86.4°$ $\theta_{2recOut}=-5.3°$ This example of a substantially collinear embodiment can be made using the same apparatus and procedures as the preferred embodiment by modifying the angles of the light beams in the apparatus to correspond to the calculated values for this alternative embodiment. The degree of mismatch between the two vectors that the system can tolerate while still reflecting light is dependent on the characteristics of photosensitive material, the spatial frequencies of the individual holograms, and orientations of those holograms.

In the preferred embodiment, the angles $\theta_{1outInt}$ and $\theta_{2inInt}$ are −90° and 90°, respectively. The vectors, $v_{1outInt}$ 150 and $v_{2inInt}$ 152, that correspond to these angles are collinear and parallel to the upper surface 28 of the film 20. As long as the vectors, $v_{1outInt}$ 150 and $v_{2inInt}$ 152, are substantially collinear, light can be reflected by the system. However, the vectors, $v_{1outInt}$ 150 and $v_{2inInt}$ 152, do not need to be parallel to the plane of the film 20. For instance, light can be reflected when $\theta_{1outInt}=-95°$ and $\theta_{2inInt}=85°$. The parameters for an example of an alternative embodiment of a resonant system with superimposed holograms in which the vectors, $v_{1outInt}$ 150 and $v_{2inInt}$ 152, are not parallel to the film plane are shown below:

For parameters:

$\theta_{in}=30°$ $\theta_{out}=0°$ $\theta_{1outInt}=-95°$ $\theta_{2inInt}=85°$ $f_{shr}=0.96$
$\lambda_{playback}=632$ nm $\lambda_{record1}=488$ nm $\lambda_{record2}=488$ nm
$n_{filmproc}=1.522$ $n_{air}=1.000$ $n_{expose}=1.493$ $n_{prism}=1.495$
$\beta_{1recIn}=0°$ $\beta_{1recOut}=80°$ $\beta_{2recIn}=-80°$ $\beta_{2recOut}=0°$ The calculations using equations 1–26 result in:

$\theta_{1recIn}=41.4°$ $\theta_{1recOut}=73.0°$ $\theta_{2recIn}=-80.7°$ $\theta_{2recOut}=-17.7°$ This alternative embodiment, in which the vectors are not parallel to the film plane, can be made using the same apparatus and procedures as the preferred embodiment by modifying the angles of the light beams in the apparatus to correspond to the calculated values for this embodiment.

Figure 6:
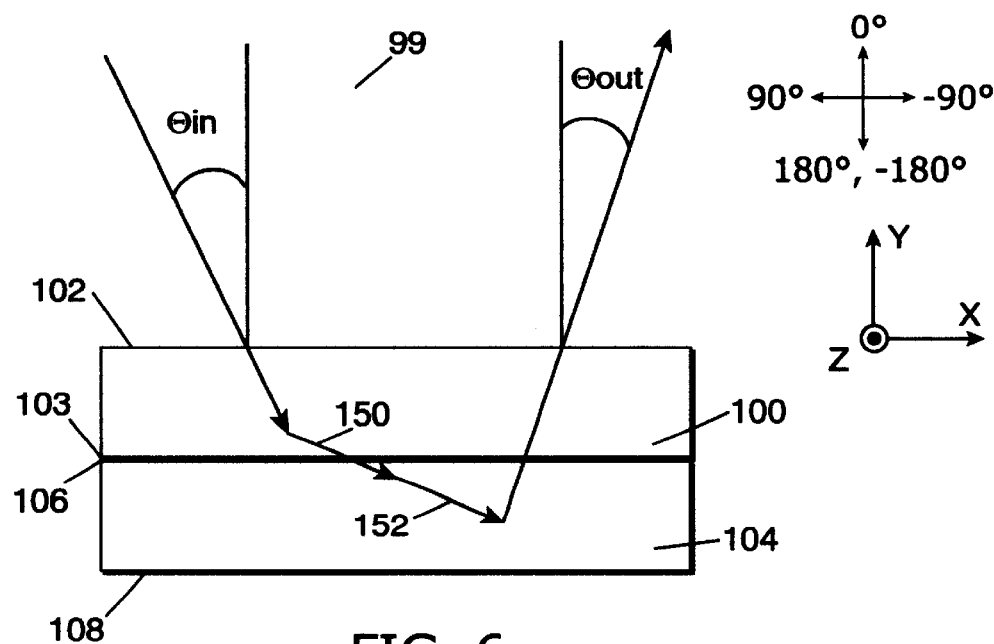
FIG. 6 is a schematic diagram that illustrates the behavior of a light beam incident upon an alternative holographic resonant system having multiple layers in which the first layer initially diffracts the beam.

In another alternative embodiment of the invention, instead of exposing two volume phase holograms on a single layer of holographic film, as in the preferred embodiment, the holographic resonant system can also be created by using multiple layers of film, each containing a volume phase hologram and each laminated together to form a single stack of layers. The lamination may be accomplished using an optical adhesive with an index of refraction close to the index of refraction of the film. FIG. 6 is a schematic diagram showing the effect of a light beam incident upon a holographic resonant system 99 having two layers of exposed film, where a first layer 100 has an upper surface 102 and a lower surface 103 and a second layer 104 has an upper surface 106 and a lower surface 108 such that the lower surface 103 of the first layer 100 is secured to the upper surface 106 of the second layer 104. The first layer 100 contains a first volume phase hologram and the second layer 104 contains a second volume phase hologram. As illustrated in FIG. 6, the first volume phase hologram of the first layer of film 100 selects an incoming light beam having an angle $\theta_{in}$ and a wavelength $\lambda_{playback}$ and diffracts the incoming light beam into the second layer of film 104. The second volume phase hologram in the second layer 104 accepts the light beam diffracted from the first volume phase hologram in the first layer 100 and diffracts the light beam a second time producing an image reflected from the holographic resonant system at an angle $\theta_{out}$ having a wavelength $\lambda_{playback}$.

In the embodiment shown in FIG. 6, the two holograms are not superimposed but the angles $\theta_{1outInt}$ and $\theta_{2inInt}$ are chosen so that the corresponding vectors, $v_{1outInt}$ 150 and $v_{2inInt}$ 152 are substantially collinear. The parameters for an example of the alternative embodiment of a resonant system with multiple layers of holograms, shown in FIG. 6, are listed below:

For parameters:

$\theta_{in}=30°$ $\theta_{out}=0°$ $\theta_{1outInt}=-100°$ $\theta_{2inInt}=80°$ $f_{shr}=0.96$
$\lambda_{playback}=632$ nm $\lambda_{record1}=488$ nm $\lambda$record2=488 nm
$n_{filmproc}=1.522$ $n_{air}=1.000$ $n_{expose}=1.493$ $n_{prism}=1.495$
$\beta_{1recIn}=0°$ $\beta_{1recOut}=80°$ $\beta_{2recIn}=-80°$ $\beta_{2recOut}=0°$ The calculations using equations 1–26 result in:

$\theta_{1recIn}=40.0°$ $\theta_{1recOut}=66.7°$ $\theta_{2recIn}=-86.2°$ $\theta_{2recOut}=-19.3°$ The multiple layer holographic resonant system, shown in FIG. 6, can be fabricated using the same apparatus as the preferred embodiment. First, the angles of the light beams in the apparatus 60 must be changed to correspond to the calculated values for this alternative embodiment. Next, in the same manner as the preferred embodiment, the beam ratios are set, the rectangular apertures 81, 83, 85 and 87 are adjusted, the exposure parameters, time$_{shutter66}$ and time$_{shutter68}$, are determined, and a first layer of photosensitive film 100 is index matched between the prism 40 and the light absorbing plate 44. Shutter 66 is then opened for time$_{shutter66}$ to expose the film. The first layer of film 100 is then removed and a second layer of film 104 is index matched between the prism 40 and the light absorbing plate 44 in the same manner as the first layer of film. Shutter 68 is then opened for time$_{shutter68}$ to expose the second layer of film 104. Finally, the two layers of film, 100 and 104, are processed, oriented so that the output of the first hologram is reflected by the second hologram, and laminated together to form the multiple layer resonant system. The hologram layers, 100 and 104, may be laminated together by pressing the layers together, pressing the layers onto the opposite sides of an optically transmissive substrate, cementing the layers together using a layer of optical adhesive, or connecting the hologram layers using a combination of layers of optical adhesive and optically transmissive substrates. The indices of refraction of the above-mentioned optical adhesives and optically transmissive substrates need to be close enough to the index of refraction, $n_{filmproc}$, of the film in the hologram layers, 100 and 104, so that total internal reflection does not block the transmission of light from the first hologram to the second hologram. Preferably, the indices of refraction of the above-mentioned optical adhesives and optically transmissive substrates would be as close as possible to $n_{filmproc}$ in order to maximize the amount of light coupled from the first hologram to the second hologram.

Figure 7:
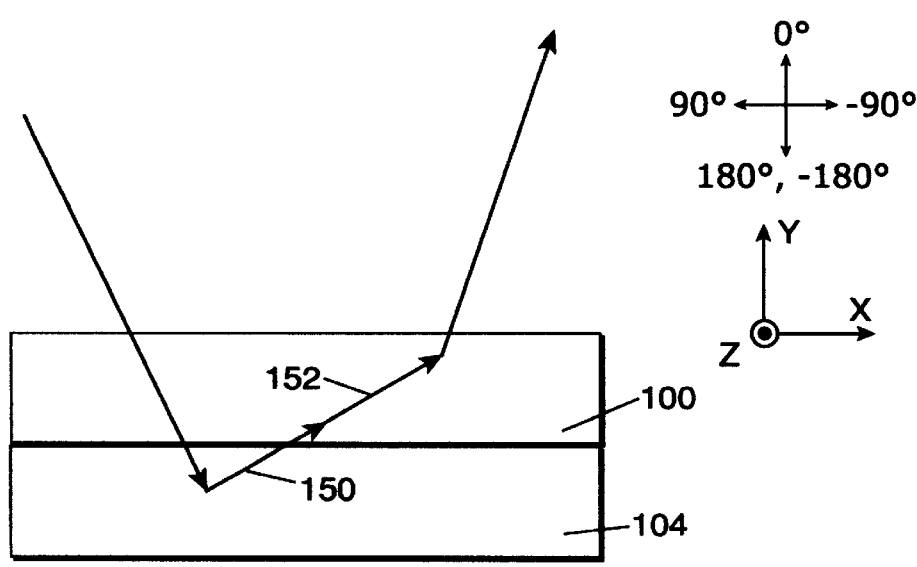
FIG. 7 is a schematic diagram similar to FIG. 6, showing the behavior of a light beam incident upon an alternative holographic resonant system having multiple layers in which the second layer initially diffracts the beam.

FIG. 7 is a schematic diagram illustrating an alternate configuration of a holographic resonant system having multiple layers where the second volume phase hologram in the second layer 104 is the first to accept the incoming light beam and diffract it into the first layer 100 and where the first volume phase hologram in the first layer 100 accepts the diffracted light beam from the second layer 104 and diffracts it to produce the image reflected from the holographic resonant system.

The parameters for an example of this alternative embodiment of a resonant system with multiple layers of holograms, shown in FIG. 7, are listed below:

For parameters:

$\theta_{in}=30°$ $\theta_{out}=0°$ $\theta_{1outInt}=-85°$ $\theta_{2inInt}=95°$ $f_{shr}=0.96$
$\lambda_{playback}=632$ nm $\lambda_{record1}=488$ nm $\lambda_{record2}=488$ nm
$n_{filmproc}=1.522$ $n_{air}=1.000$ $n_{expose}=1.493$ $n_{prism}=1.495$
$\beta_{1recIn}=0°$ $\beta_{1recOut}=80°$ $\beta_{2recIn}=-80°$ $\beta_{2recOut}=0°$ The calculations using equations 1–26 result in:

$\theta_{1recIn}=44.5°$ $\theta_{1recOut}=85.0°$ $\theta_{2recIn}=-68.9°$ $\theta_{2recOut}=-14.8°$ This alternative embodiment, illustrated in FIG. 7, can be created using the same apparatus as the preferred embodiment using the angles calculated for this embodiment. The procedures used to fabricate this system are the same as the procedures for the previous alternative embodiment shown in FIG. 6.

In yet another alternative embodiment of the invention where the holographic resonant system is created from a single layer of film, the vectors, $v_{1outInt}$ 150 and $v_{2inInt}$ 152, corresponding to the angles $\theta_{1outInt}$ and $\theta_{2inInt}$, do not need to be collinear. Instead, total internal reflection from the surface of the film can be used to reflect the output of the first hologram to the input angle of the second hologram in a single layer having two superimposed holograms if the following conditions are met:

(i) $v_{1outInt}$ and $v_{2inInt}$ are coplanar;

(ii) $\theta 1outInt=-\theta_{2inInt}$;

(iii) $|\theta_{2inInt}|$ is greater than the critical angle $\theta_{critFilmAdj}$ for the photosensitive material with respect to the material adjacent to the surface of the film;

(iv) $|\theta_{2inInt}|$ is less than $(180°-\theta_{critFilmAdj})$; and (v) $|\theta_{2inInt}| \neq 90°$ More specifically, any two vectors corresponding to a real reflection of a light beam are coplanar, which is condition (i), and when reflected, the angle of incidence equals the angle of reflectance, which is condition (ii). If the two vectors do not meet these two conditions, then they cannot correspond to a reflection of a light beam and therefore cannot be a valid path for light from the first hologram to the second hologram. If $\theta_{2inInt}$ is less that the critical angle, $\theta_{critFilmAdj}$, the light will strike the top surface but will not be totally internally reflected. If $\theta_{2inInt}$ is greater that the 180°-critical angle, the light will strike the bottom surface but will not be totally internally reflected. Finally, if the absolute value of $\theta_{2inInt}$ equals 90°, then the coupling light beams with not strike either surface.

$\theta_{critFilmAdj}$ can be computed using the following equation and the index of refraction of the material adjacent to the surface of the film, $n_{Adj}$. In this case, the adjacent material is air so $n_{Adj}=1.0$.

$$\theta_{critFilmAdj}=\text{Arc }\sin(n_{Adj}/n_{filmproc}) \quad (29)$$

Figure 10A:
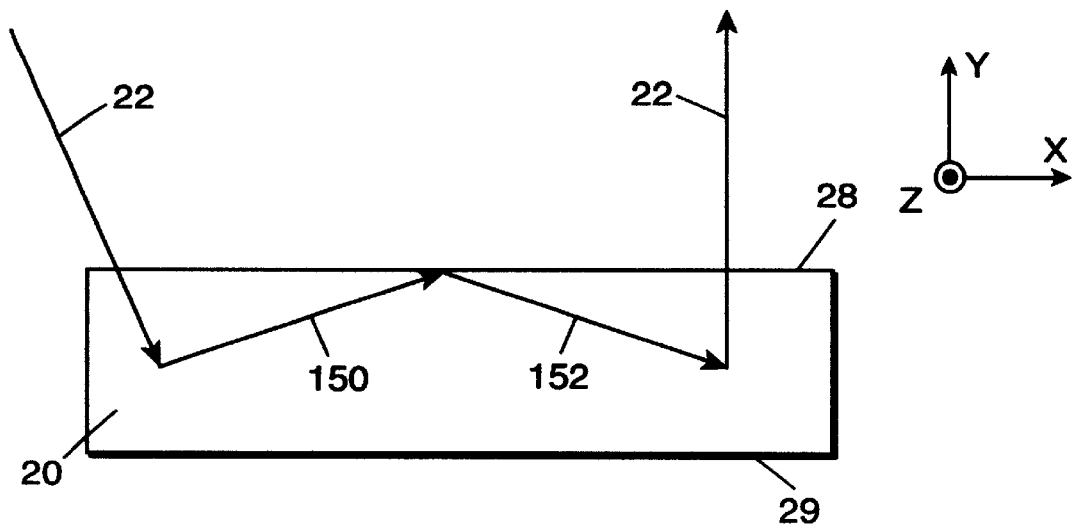
FIG. 10A is a schematic diagram that illustrates the behavior of a light beam incident upon an alternative single layer holographic resonant system that uses total internal reflection from the top surface of the film to couple the output of one hologram to the input of another hologram.
Figure 10B:
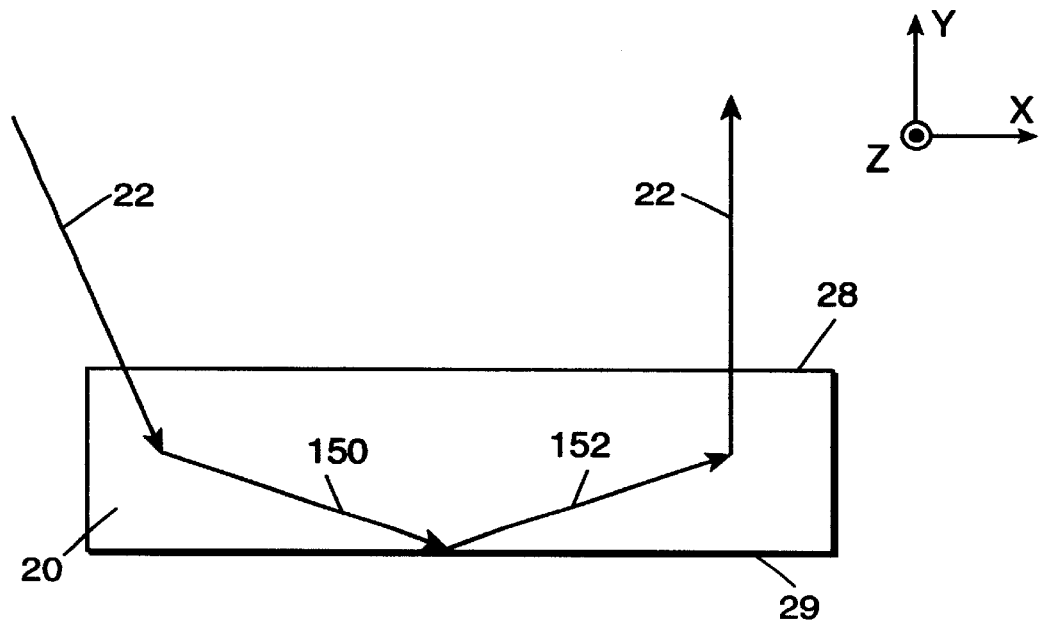
FIG. 10B is a schematic diagram that illustrates the behavior of a light beam incident upon another alternative single layer holographic resonant system that uses total internal reflection from the bottom surface of the film to couple the output of one hologram to the input of another hologram.

FIGS. 10A and 10B illustrate alternative embodiments where the vectors $v_{1outInt}$ 150 and $v_{2inInt}$ 152 are not collinear and where total internal reflection is present. In FIG. 10A, an incident light beam 22 enters the photosensitive film 20 and is diffracted by the first hologram superimposed on the film 20. The diffracted beam is totally internally reflected back into the film 20 by the upper surface 28 of the film 20. The second hologram superimposed on the film diffracts the reflected beam a second time sending the beam through the top surface 28 of film 20 producing an image reflected from the holographic resonant system. The parameters for an example of this alternative embodiment of a holographic resonant system in which total internal reflection off the top surface of the film is used to reflect the output of the first hologram into the input of the second hologram are shown below:

For parameters:

$\theta_{in}=30°$ $\theta_{out}=0°$ $\theta_{1outInt}=-85°$ $\theta_{2inInt}=85°$ $f_{shr}=0.96$ $\lambda_{playback}=632$ nm $\lambda_{record1}=488$ nm $\lambda_{record2}=488$ nm $n_{filmproc}=1.522$ $n_{air}=1.000$ $n_{expose}=1.493$ $n_{prism}=1.495$ $\beta_{1recIn}=0°$ $\beta_{1recOut}=80°$ $\beta_{2recIn}=-80°$ $\beta_{2recOut}=0°$ The calculations using equations 1–26 result in:

$\theta_{1recIn}=44.5°$ $\theta_{1recOut}=85.0°$ $\theta_{2recIn}=-80.7°$ $\theta_{2recOut}=-17.7°$ This alternative embodiment, illustrated in FIG. 10A, can be fabricated using the same apparatus and procedures as the preferred embodiment by modifying the angles of the light beams in the apparatus to correspond to the calculated values for this embodiment.

Alternatively, as shown in FIG. 10B, incident light beam 22 enters the photosensitive film 20 and is diffracted by the first hologram superimposed on the film 20. The diffracted beam is totally internally reflected back into the film 20 by the lower surface 29 of the film 20. The second hologram superimposed on the film diffracts the reflected beam a second time sending the beam through the upper surface 28 of film 20 producing an image reflected from the holographic resonant system. The parameters for an example of an alternative embodiment of a holographic resonant system in which total internal reflection off the bottom surface of the film is used to reflect the output of the first hologram into the input of the second hologram are shown below:

For parameters:

$\theta_{in}=30°$ $\theta_{out}=0°$ $\theta_{1outInt}=-100°$ $\theta_{2inInt}=100°$ $f_{shr}=0.96$ $\lambda_{playback}=632$ nm $\lambda_{record1}=488$ nm $\lambda_{record2}=488$ nm $n_{filmproc}=1.522$ $n_{air}=1.000$ $n_{expose}=1.493$ $n_{prism}=1.495$ $\beta_{1recIn}=0°$ $\beta_{1recOut}=80°$ $\beta_{2recIn}=-80°$ $\beta_{2recOut}=0°$ The calculations using equations 1–26 result in:

$\theta_{1recIn}=40.0°$ $\theta_{1recOut}=66.7°$ $\theta_{2recIn}=-62.7°$ $\theta_{2recOut}=-13.5°$ This alternative embodiment, illustrated in FIG. 10B, can be fabricated using the same apparatus and procedures as the preferred embodiment by modifying the angles of the light beams in the apparatus to correspond to the calculated values for this embodiment.

In yet another further alternative embodiment of the invention where the holographic resonant system is created with multiple layers of film as described above, the vectors, $v_{1outInt}$ 150 and $v_{2inInt}$ 152, corresponding to the angles $\theta_{1outInt}$ and $\theta_{2inInt}$, similarly do not need to be collinear. Instead, total internal reflection from a surface of the film of one of the layers can be used to reflect the output of the first hologram to the input angle of the second hologram in a system having two layers of photosensitive film, each containing a single volume phase hologram, if the following conditions are met:

(i) $v_{1outInt}$ and $v_{2inInt}$ are coplanar;

(ii) $\theta_{1outInt}=-\theta_{2inInt}$;

(iii) $|\theta_{2inInt}|$ is greater than the critical angle $\theta_{critFilmAdj}$ for the photosensitive material with respect to the material adjacent to the surface of the film;

(iv) $|\theta_{2inInt}|$ is less than $(180°-\theta_{critFilmAdj})$; and (v) $|\theta_{2inInt}| \neq 90°$ These are the same conditions discussed in the description of the embodiments illustrated in FIGS. 10A and 10B.

Figure 11A:
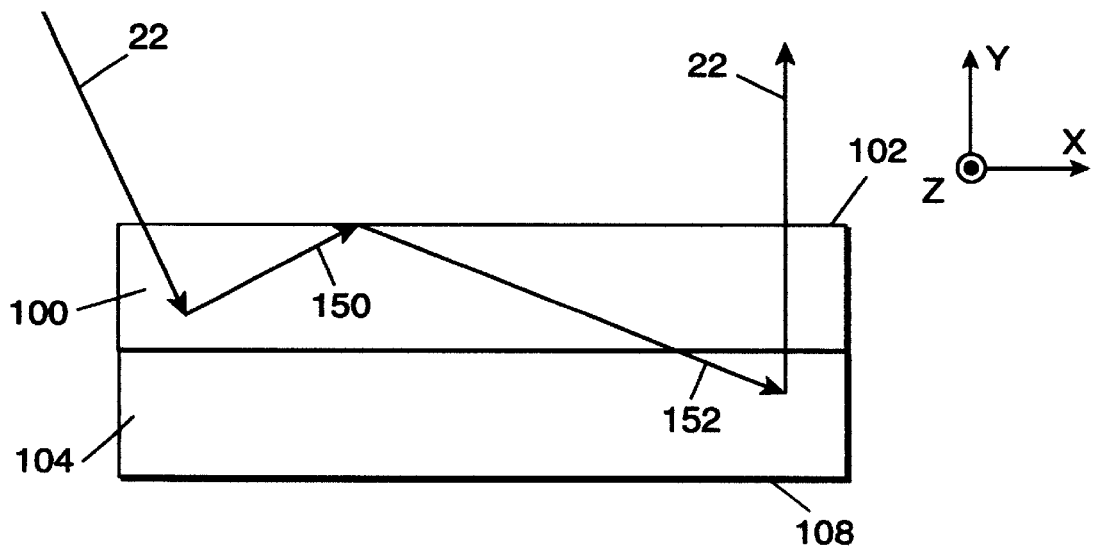
FIG. 11A is a schematic diagram that illustrates the behavior of a light beam incident upon an alternative multiple layer holographic resonant system that uses total internal reflection from a top surface of a top layer of film to couple the output of one hologram to the input of another hologram.
Figure 11B:
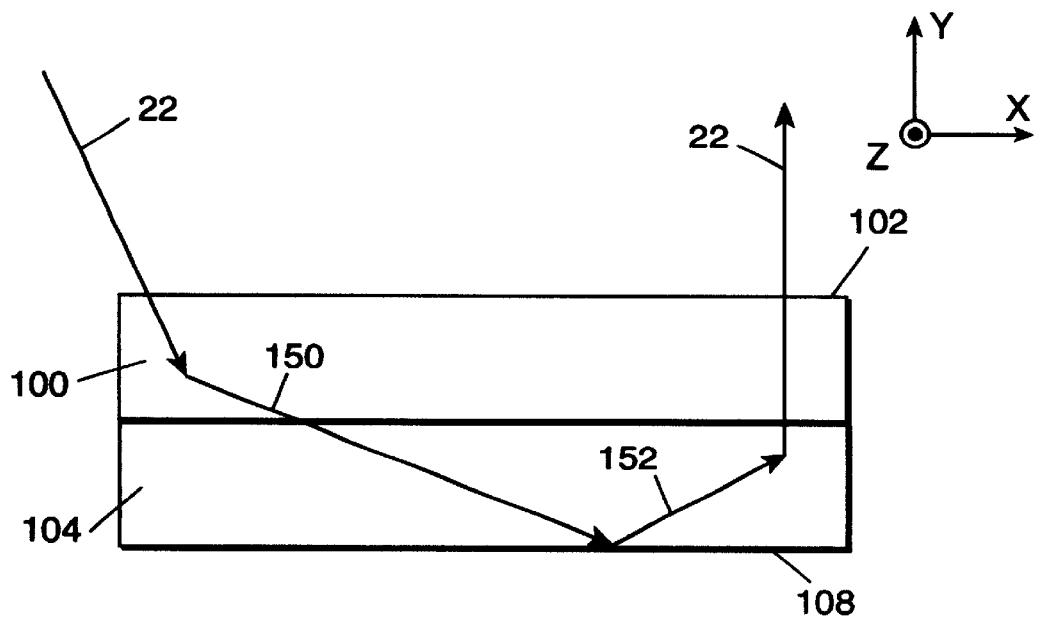
FIG. 11B is a schematic diagram that illustrates the behavior of a light beam incident upon another alternative multiple layer holographic resonant system that uses total internal reflection from a bottom surface of a bottom layer of film to couple the output of one hologram to the input of another hologram.

FIGS. 11A and 11B illustrate alternative embodiments in a multiple layer holographic resonant system where the vectors, $v_{1outInt}$ 150 and $v_{2inInt}$ 152, are not collinear and where total internal reflection is present. As shown FIG. 11A, incident light beam 22 enters the first layer of photosensitive film 100 and is diffracted by the first hologram in the first layer of film 100. The diffracted beam is totally internally reflected back into the film 100 by the upper surface 102 of the film 100. The light beam then travels through the first layer of film 100 into the second layer of film 104. The second hologram in the second layer of film 104 diffracts the reflected beam a second time sending the beam back through the upper surface 102 of the first layer of film 100 producing an image reflected from the holographic resonant system. The parameters for an example of an alternative embodiment of a holographic resonant system in which total internal reflection off the upper surface 102 of the upper layer of film 100 is used to reflect the output of the first hologram into the input of the second hologram are shown below:

For parameters:

$\theta_{in}=30°$ $\theta_{out}=0°$ $\theta_{1outInt}=-85°$ $\theta_{2inInt}=85°$ $f_{shr}=0.96$ $\lambda_{playback}=632$ nm $\lambda_{record1}=488$ nm $\lambda_{record2}=488$ nm $n_{filmproc}$=1.522 $n_{air}$=1.000 $n_{expose}$=1.493 $n_{prism}$=1.495
$\beta_{1recIn}$=0° $\beta_{1recOut}$=80° $\beta_{2recIn}$=−80° $\beta_{2recOut}$=0°
The calculations using equations 1–26 result in:
$\theta_{1recIn}$=44.5° $\theta_{1recOut}$=85.0° $\theta_{2recIn}$=−80.7° $\theta_{2recOut}$=−17.7°

This alternative embodiment, illustrated in FIG. 11A, can also be fabricated using the same apparatus and procedures as the alternative embodiment, shown in FIG. 6, by modifying the angles of the light beams in the apparatus to correspond to the calculated values for this embodiment.

Alternatively, as shown FIG. 11B, incident light beam 22 enters the top and first layer of photosensitive film 100 and is diffracted by the first hologram in the first layer of film 100. The diffracted beam enters the bottom and second layer of film 104 and is totally internally reflected back into the second layer of film 104 by the lower surface 108 of the second layer of film 104. The second hologram in the second layer of film 104 diffracts the reflected beam a second time sending the beam back through the upper surface 102 of the first layer of film 100 and producing an image reflected from the holographic resonant system. The parameters for an example of an alternative embodiment of this multiple layer holographic resonant system in which total internal reflection off the lower surface 108 of the bottom layer of film 104 is used to reflect the output of the first hologram into the input of the second hologram are shown below:

For parameters:
$\theta_{in}$=30° $\theta_{out}$=0° $\theta_{outInt}$=−100° $\theta_{2inInt}$=100° $f_{shr}$=0.96
$\lambda_{playback}$=632 nm $\lambda_{record1}$=488 nm $\lambda_{record2}$=488 nm
$n_{filmproc}$=1.522 $n_{air}$=1.000 $n_{expose}$=1.493 $_{prism}$=1.495
$\beta_{1recIn}$=0° $\beta_{1recOut}$=80° $\beta_{2recIn}$=−80° $\beta_{2recOut}$=0°
The calculations using equations 1–26 result in:
$\theta_{1recIn}$=40.0° $\theta_{1recOut}$=66.7° $\theta_{2recIn}$=−62.7° $\theta_{2recOut}$=−13.5°

This alternative embodiment, illustrated in FIG. 11B, can also be fabricated using the same apparatus and procedures as the alternative embodiment, shown in FIG. 6, by modifying the angles of the light beams in the apparatus to correspond to the calculated values for this embodiment.

All of the previously described alternative embodiments of the invention that use total internal reflection from a surface of a layer of film, as shown in FIGS. 10A, 10B, 11A and 11B, can be further altered by adding an optically transmissive layer. In general, the beam diffracted from the first hologram can enter the optically transmissive layer and be totally internally reflected to the second hologram by an external surface of the optically transmissive layer if the following conditions are met:

(i) $|\theta_{2inInt}|<\theta_{critFilmTrans}$ or $|\theta_{2inInt}|>(180°-\theta_{critFilmTrans})$; and (ii) the optically transmissive layer is laminated to the holographic resonant system surface which would have provided total internal reflection to steer the light diffracted from the first hologram to the second hologram.

More specifically, the first condition determines if any of the light diffracted by the first hologram can get from the holographic resonant system to the optically transmissive layer. The second condition specifies which side of the resonant system to which the optically transmissive layer should be laminated. In this instance, $\theta_{critFilmTrans}$ can be computed using $n_{trans}$, the greater of the index of refraction of the optically transmissive layer and the index of refraction of the any adhesive used to attach the photosensitive film to the optically transmissive layer, and the following equation.

$$\theta_{critFilmTrans} = \text{Arc } \sin(n_{trans}/n_{filmproc}) \quad (30)$$

Figure 12A:
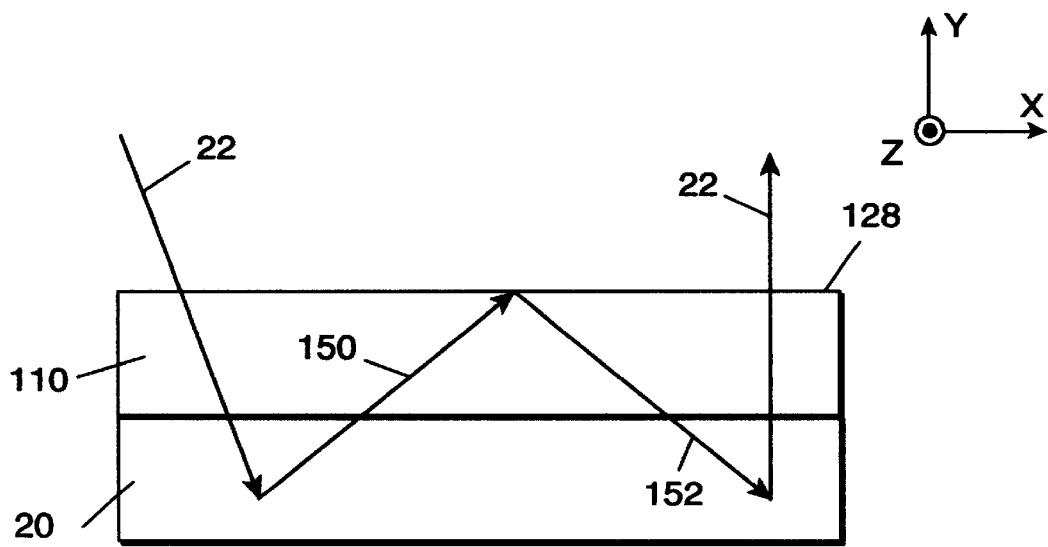
FIG. 12A is a schematic diagram of an alternative holographic resonant system having a top optically transmissive layer and a bottom layer containing superimposed holograms, illustrating the behavior of a light beam incident upon the alternative holographic resonant system that uses total internal reflection from the top surface of an optically transmissive layer to couple the output of one hologram in the bottom layer to the input of another hologram also in the bottom layer.
Figure 12B:
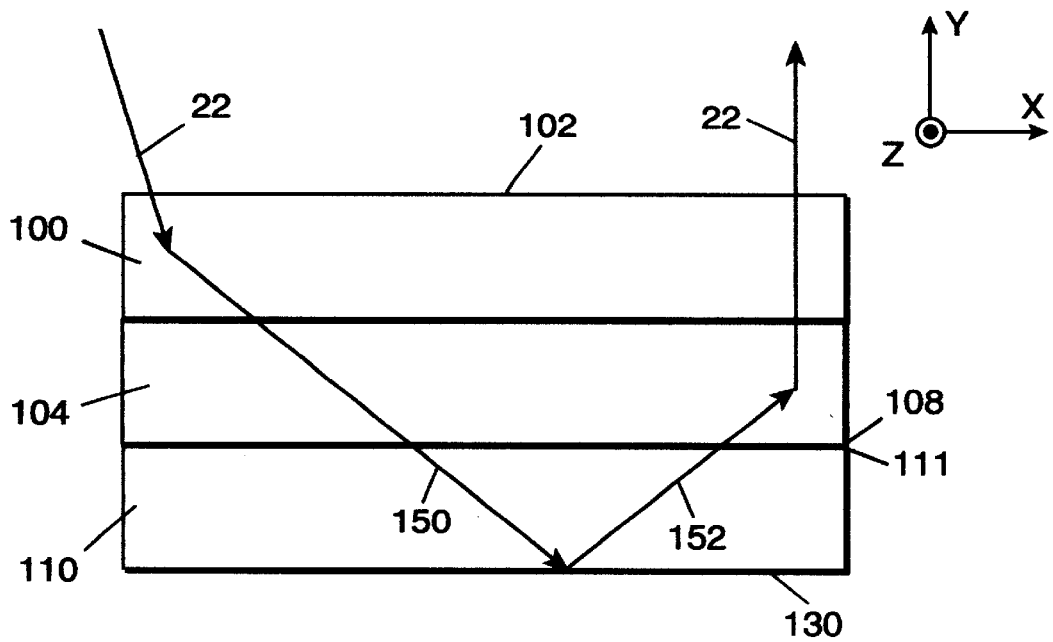
FIG. 12B is a schematic diagram of an alternative holographic resonant system having a bottom optically transmissive layer and a top and a middle layer each containing a hologram, illustrating the behavior of a light beam incident upon the alternative holographic resonant system that uses total internal reflection from the bottom surface of an optically transmissive layer to couple the output of one hologram in the top layer to the input of another hologram in the middle layer.

FIGS. 12A and 12B illustrate embodiments of this alternative where an optically transmissive layer 110 is laminated to a single layer holographic resonant system and a multiple layer holographic resonant system, respectively, which both use total internal reflection to transmit light from one hologram to the other.

In FIG. 12A, a holographic resonant system having a layer of film 20 with two superimposed holograms, similar to the one described above and shown in FIG. 10A, is laminated to the bottom of optically transmissive layer 110. Light beam 22, incident upon optically transmissive layer 110, travels through the optically transmissive layer 110 and is then diffracted by the first hologram that has been superimposed on the layer of film 20. The diffracted beam then enters the optically transmissive layer 110 and is totally internally reflected back into the optically transmissive layer by a top surface 128 of the layer 110. The reflected beam then enters the layer of film 20, and the second hologram superimposed on the layer of film 20, diffracts the reflected beam a second time producing an image reflected from the holographic resonant system. For the sake of clarity, the refraction of the light beams at the interface between the resonant system 20 and the optically transmissive layer 110 is not shown in FIG. 12A.

Alternatively, as shown in FIG. 12B, a multiple layer holographic resonant system consisting of layers 100 and 104, similar to the one previously described and shown in FIG. 11B, is laminated to the top of optically transmissive layer 110, such that lower surface 108 of the bottom layer of film 104 is laminated to an upper surface 111 of the optically transmissive layer 110. Light beam 22, incident upon the first layer of photosensitive film 100, enters the upper surface 102 of the photosensitive film 100 and is diffracted by the first hologram in the first layer of film 100. The diffracted beam first passes through the bottom surface of the first layer of film 100 and then passes through the second layer of film 104. Thereafter, the diffracted beam enters the upper surface 111 of the bottom optically transmissive layer 110 and is totally internally reflected back into the optically transmissive layer 110 by a bottom surface 130 of the optically transmissive layer 110. The beam then reenters the second layer of film 104 through its lower surface 108. The second hologram in the second layer of film 104 diffracts the reflected beam a second time sending the beam back through the upper surface 102 of the top layer of film 100, producing an image reflected from the holographic resonant system. Again, for the sake of clarity, the refraction of the light beams at the interface between layer 104 and the optically transmissive layer 110 is not shown.

In all of the previously described embodiments, the image reflected by the holographic resonant system is a point source of light. However, three-dimensional images can also be recorded with the holographic resonant system in a manner similar to conventional reflection holograms. Since three-dimensional images can be recorded with any of the previously discussed embodiments, one of these embodiments of the holographic resonant system must first be chosen in order to determine the exposure procedures and the values of angles $\theta_{1outInt}$ and $\theta_{2inInt}$. In the following example, the preferred embodiment, where the holographic resonant system consists of single layer with two superimposed holograms, is used to create a holographic resonant system that reflects a three-dimensional image. In this case, $\theta_{in}$ corresponds to the desired angle of illumination, 45°. The angle $\theta_{out}$ corresponds to the desired angle of the center of the image of the object when the resonant system is illuminated. The parameters for this example where $\theta_{1outInt}$=−90° and $\theta_{2inInt}=90°$ are shown below and the recording angles, $\theta_{1recIn}$, $\theta_{1recOut}$, $\theta_{2recIn}$ and $\theta_{2recOut}$, are calculated using equations 1–26.

Figure 13:
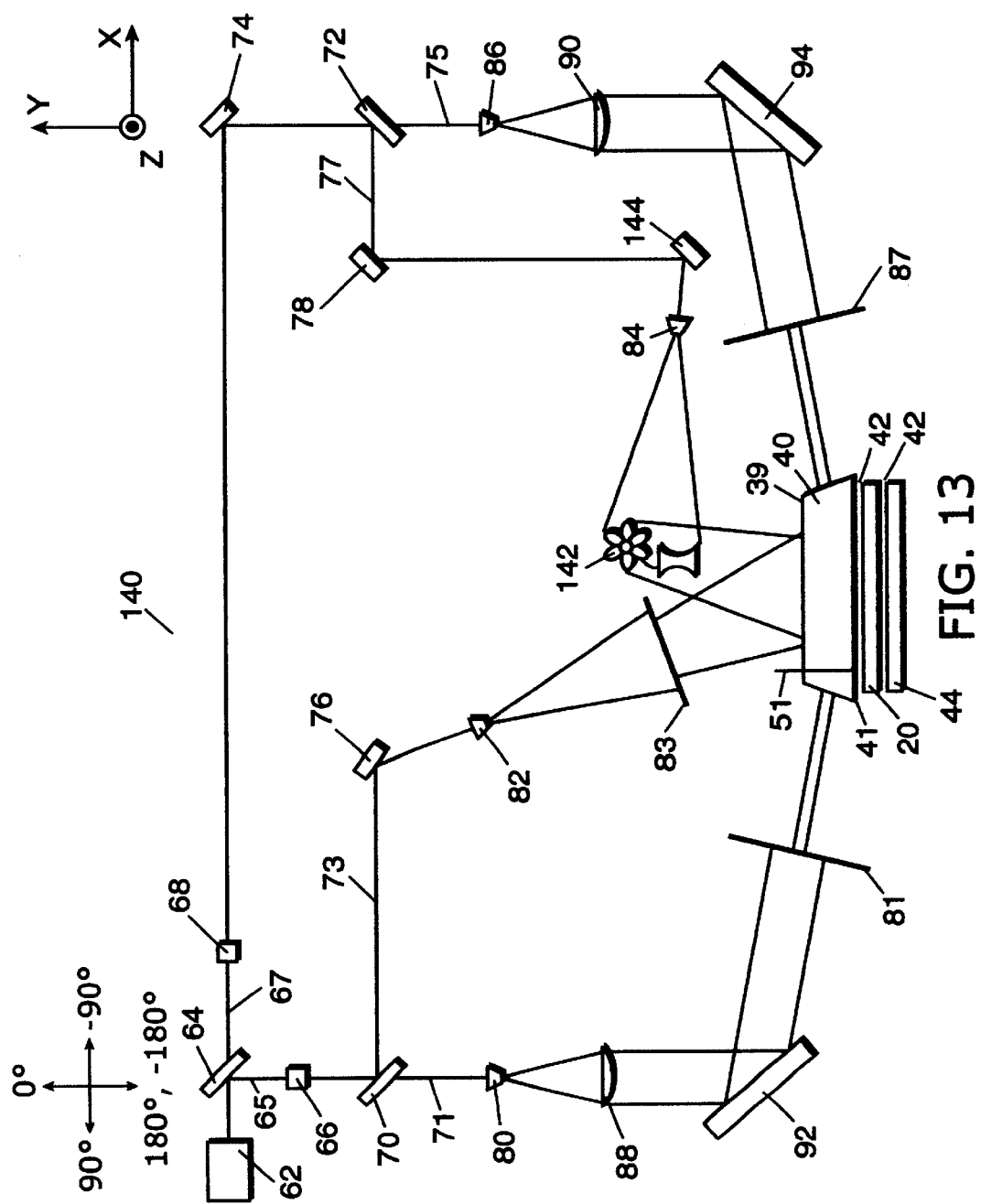
FIG. 13 illustrates an apparatus for creating a holographic resonant that reflects images recorded directly from a real object.

For parameters:

$\theta_{in}=45°$ $\theta_{out}=0°$ $\theta_{1outInt}=-90°$ $\theta_{2inInt}=90°$ $f_{shr}=0.96$ $\lambda_{playback}=632$ nm $\lambda_{record1}=488$ nm $\lambda_{record2}=488$ nm $n_{filmproc}=1.522$ $n_{air}=1.000$ $n_{expose}=1.493$ $n_{prism}=1.495$ $\beta_{1recIn}=0°$ $\beta_{1recOut}=80°$ $\beta_{2recIn}=-80°$ $\beta_{2recOut}=0°$ The calculations using equations 1–26 result in:

$\theta_{1recIn}=57.8°$ $\theta_{1recOut}=80.9°$ $\theta_{2recIn}32$ $-74.9°$ $\theta_{2recOut}=-16.2°$ FIG. 13 shows a schematic diagram of an apparatus 140 for manufacturing a holographic resonant system that records the image of a three-dimensional object. The manufacturing apparatus 140 shown in FIG. 13 is very similar to the manufacturing apparatus 60 shown in FIG. 5. In this regard, identical components will be referenced with identical component reference numbers. The manufacturing apparatus 140 includes laser 62, variable beamsplitters 70 and 72, 50-50 beamsplitter 64, shutters 66 and 68, mirrors 74, 76, 78, 92, 94 and 144, spatial filters 80, 82, 84 and 86, rectangular apertures 81, 83 and 87, collimating lenses 88 and 90, prism 40, film 20, light absorber 44, xylene index matching layers 42 and an object 142 whose image is recorded. As in the manufacturing apparatus 60 described in FIG. 5, the manufacturing apparatus 140, shown in FIG. 13, should be utilized on a vibration free optical table. For one of ordinary skill in the art, the fact that light-colored, solid objects with hard surfaces are the easiest to record with holograms may be considered in the selection of object 142.

Again, as noted above, the normal 51 to the lower surface 41 of prism 40 represents 0 degrees and angles to the left of the normal are positive, while angles to the right are negative. Continuing with the example, where the exposure angles are $\theta_{1recIn}=57.8°$, $\theta_{1recOut}=80.9°$, $\theta_{2recIn}=-74.9°$, and $\theta_{2recOut}=-16.2°$ the manufacturing apparatus 140 is set up such that the laser 62 emits a laser beam at $-90°$ and applies this laser beam to 50-50 beamsplitter 64 producing light beams 65 and 67. Beamsplitter 64 then applies the resulting light beam 65 to shutter 66 at 180° and the second resulting light beam 67 to shutter 68 at $-90°$. Next, shutter 66 applies light beam 65 to variable beamsplitter 70 at 180°, which in turn splits light beam 65 into light beams 71 and 73. Light beam 71 is applied to spatial filter 80 at 180°, which in turn applies light beam 71 to collimating lens 88 at 180°. Mirror 92 is set up relative to the collimating lens 88 and prism 40 such that the mirror accepts light beam 71 at 0° and reflects it such that light beam 71 forms angle $\theta_{1recOut}=80.9°$ with respect to prism normal 51 after passing through rectangular aperture 81. Meanwhile, light beam 73 is applied to mirror 76 at $-90°$. Mirror 76 is positioned such that it accepts light beam 73 at 90° from variable beamsplitter 70 and reflects light beam 73 such that light beam 73 forms angle $\theta_{1recIn}=57.8°$ with respect to prism normal 51 after passing through spatial filter 82 and rectangular aperture 83.

While shutter 66 controls and directs light beam 65, shutter 68 controls and directs light beam 67 at $-90°$ to mirror 74. Mirror 74 is oriented such that it accepts light beam 67 at 90° and reflects it at 180° to variable beamsplitter 72. Variable beamsplitter 72 splits light beam 67 into light beams 75 and 77. Light beam 75 is applied to spatial filter 86 at 180°, which in turn applies light beam 75 to collimating lens 90 at 180°. Mirror 94 is set up relative to the collimating lens 90 and prism 40 such that the mirror accepts light beam 75 at 0° and reflects it such that light beam 75 forms angle $\theta_{2recIn}=-74.9°$ with respect to prism normal 51 after passing through rectangular aperture 87. Meanwhile, light beam 77 is applied to mirror 78 at 90°. Mirror 78 is positioned such that it accepts light beam 77 at $-90°$ from variable beamsplitter 72 and reflects light beam 77 at 180° to mirror 144. Mirror 144 is positioned to reflect the light beam at the center of the object 142 after passing through spatial filter 84. The object 142 is positioned such that light reflected from the center of the object 142 enters the prism 40 at an angle $\theta_{2recOut}=-16.2°$ with respect to prism normal 51 and strikes the center of the photosensitive film.

Again a noted above, all of the light beams must strike the same area of the photosensitive film after passing through the prism in order to form the two superimposed holograms. The sizes and positions of rectangular apertures 81, 83 and 87 are adjusted so that the beams all fill the same rectangular area on the photosensitive film.

The procedures to make an exposure and to process the photosensitive film in this example are similar to the procedures described above for the preferred embodiment except for the adjustment of beamsplitter 72. In this instance, while shutter 68 is open, the variable beamsplitter 72 is first adjusted so that the ratio of the energies of the resulting light beams 75 and 77 reaching the film 20 is between 1.5:1 and 2:1, typical true beam ratios for reflection holography. This range 1.5:1 to 2:1 is an initial range with which to begin making test exposures to find the best value, which depends on the characteristics of object 142.

For one skilled in the art, it is apparent that the angles of the light beams in manufacturing apparatus 140 can easily be varied within certain ranges by changing the positions and orientations of mirrors 76, 78, 92, 94 and 144, rectangular apertures 81, 83 and 87, object 142, and spatial filters 82 and 84. Also, prism 40 can be interchanged with other prisms having different face angles and thicknesses for even more flexibility. This flexibility allows this setup to be used to create a variety of different holographic resonant systems that produce images of three-dimensional objects by varying exposure angles, $\theta_{1recIn}$, $\theta_{1recOut}$, $\theta_{2recIn}$ and $\theta_{2recOut}$.

Figure 14:
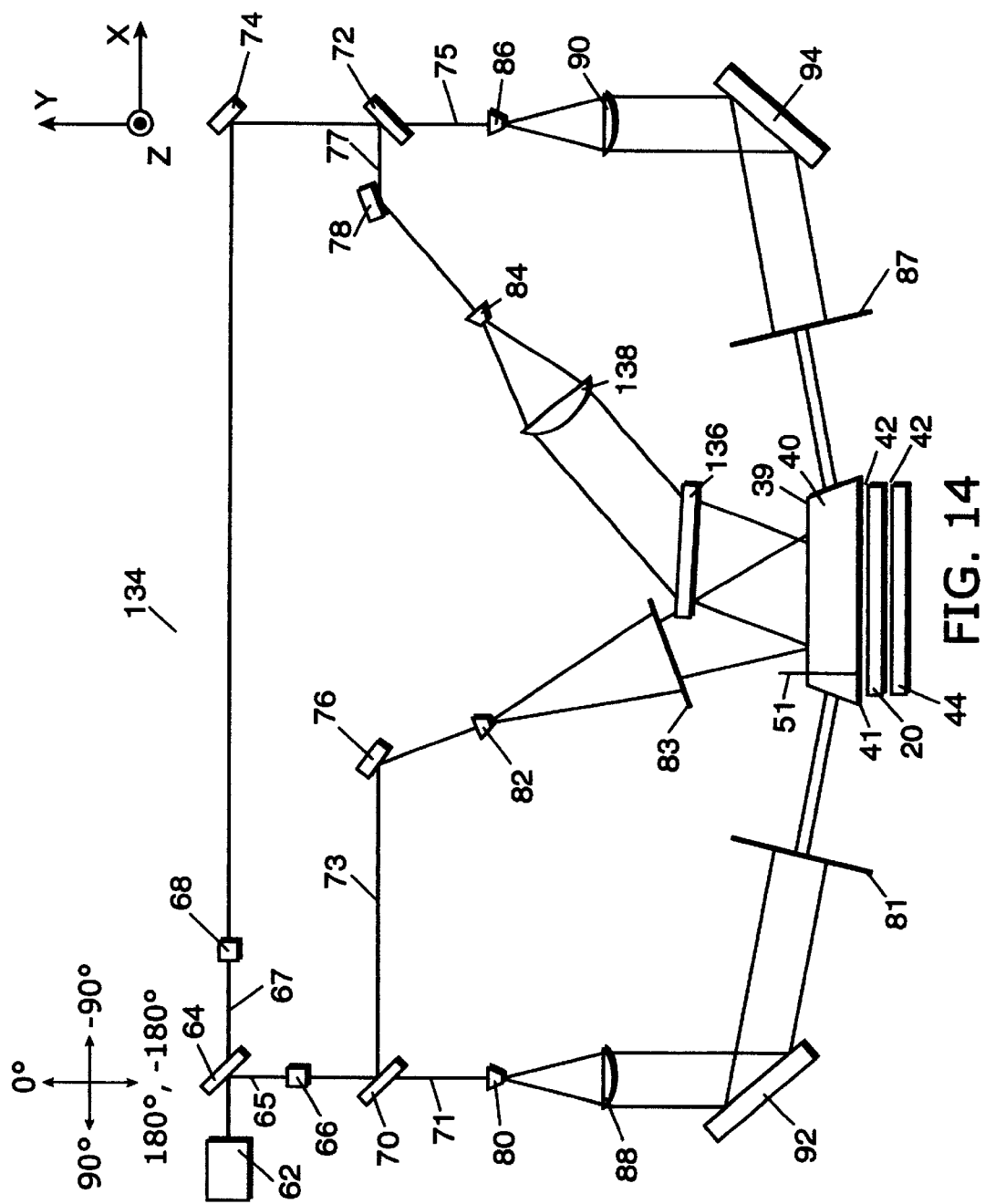
FIG. 14 illustrates an apparatus for creating a holographic resonant that reflects images recorded from a master hologram.

Alternatively, instead of using an actual object to record a three-dimensional image, a hologram can also be used to generate the wavefronts corresponding to an object. FIG. 14 shows a schematic diagram of an apparatus 134 for manufacturing a holographic resonant system using a hologram to record the image of a three-dimensional object projected from a master hologram. The manufacturing apparatus 134 shown in FIG. 14 is very similar to both the manufacturing apparatus 140 shown in FIG. 13 and the manufacturing apparatus 60 shown in FIG. 5. The same parameters for the holographic resonant system created using the manufacturing apparatus 140 in FIG. 13 can be used to create an example holographic resonant system using the manufacturing apparatus 134 in FIG. 14.

For parameters:

$\theta_{in}=45°$ $\theta_{out}=0°$ $\theta_{1outInt}=-90°$ $\theta_{2inInt}=90°$ $f_{shr}=0.96$ $\lambda_{playback}=632$ nm $\lambda_{record1}=488$ nm $\lambda_{record2}=488$ nm $n_{filmproc}=1.522$ $n_{air}=1.000$ $n_{expose}=1.493$ $n_{prism}=1.495$ $\beta_{1recIn}=0°$ $\beta_{1recOut}=80°$ $\beta_{2recIn}=-80°$ $\beta_{2recOut}=0°$ The calculations using equations 1–26 result in:

$\theta_{1recIn}=57.8°$ $\theta_{1recOut}=80.9°$ $\theta_{2recIn}=-74.9°$ $\theta_{2recOut}=-16.2°$ Again, as in the manufacturing system 60 described in FIG. 5, the manufacturing apparatus 134 shown in FIG. 14 should be utilized on a vibration free optical table. It will be appreciated that identical components of the manufacturing systems, shown in FIGS. 5, 13 and 14, will be referenced with identical component reference numbers. The manufacturing apparatus 134, shown in FIG. 14, includes laser 62, variable beamsplitters 70 and 72, 50—50 beamsplitter 64, shutters 66 and 68, mirrors 74, 76, 78, 92 and 94, spatial filters 80, 82, 84 and 86, rectangular apertures 81, 83 and 87, collimating lenses 88, 90 and 138, prism 40, film 20, light absorber 44, xylene index matching layers 42 and an off-axis laser transmission hologram 136.

Again, as noted above, the normal 51 to the lower surface 41 of prism 40 represents 0 degrees and angles to the left of the normal are positive, while angles to the right are negative. Continuing with the example, where the exposure angles are $\theta_{1recIn}$=57.8°, $\theta_{1recOut}$=80.9°, $\theta_{2recIn}$=−74.9°, and $\theta_{2recOut}$=−16.2° the manufacturing apparatus 134 is set up such that the laser 62 emits a laser beam at −90° and applies this laser beam to 50-50 beamsplitter 64 producing light beams 65 and 67. Beamsplitter 64 then applies the resulting light beam 65 to shutter 66 at 180° and the second resulting light beam 67 to shutter 68 at −90°. Next, shutter 66 applies light beam 65 to variable beamsplitter 70 at 180°, which in turn splits light beam 65 into light beams 71 and 73. Light beam 71 is applied to spatial filter 80 at 180°, which in turn applies light beam 71 to collimating lens 88 at 180°. Mirror 92 is set up relative to the collimating lens 88 and prism 40 such that the mirror accepts light beam 71 at 0° and reflects it such that light beam 71 forms angle $\theta_{1recOut}$=80.9° with respect to prism normal 51 after passing through rectangular aperture 81. Meanwhile, light beam 73 is applied to mirror 76 at −90°. Mirror 76 is positioned such that it accepts light beam 73 at 90° from variable beamsplitter 70 and reflects light beam 73 such that light beam 73 forms angle $\theta_{1recIn}$= 57.8° with respect to prism normal 51 after passing through spatial filter 82 and rectangular aperture 83.

While shutter 66 controls and directs light beam 65, shutter 68 controls and directs light beam 67 at −90° to mirror 74. Mirror 74 is oriented such that it accepts light beam 67 at 90° and reflects it at 180° to variable beamsplitter 72. Variable beamsplitter 72 splits light beam 67 into light beams 75 and 77. Light beam 75 is applied to spatial filter 86 at 180°, which in turn applies light beam 75 to collimating lens 90 at 180°. Mirror 94 is set up relative to the collimating lens 90 and prism 40 such that the mirror accepts light beam 75 at 0° and reflects it such that light beam 75 forms angle $\theta_{2recIn}$=−74.9° with respect to prism normal 51 after passing through rectangular aperture 87. Meanwhile, light beam 77 is applied to mirror 78 at 90°. Mirror 78 is positioned such that it accepts light beam 77 at −90° from variable beamsplitter 72 and reflects light beam 77 to the off-axis laser transmission hologram. Mirror 78, spatial filter 84 and collimating lens 138 are positioned such that they transform light beam 77 into a conjugate illumination beam for the off-axis laser transmission hologram 136. The center of the hologram 136 is positioned such that light transmitted from the center of the hologram enters the prism 40 at an angle $\theta_{2recOut}$=−16.2° with respect to prism normal 51 and strikes the center of the photosensitive film. The hologram 136 is rotated about an axis passing through the center of the hologram 136 in the Z direction until the pseudoscopic image projected from the hologram 136 is centered on a line corresponding to the light transmitted from the center of the hologram which enters the prism 40 at an angle $\theta_{2recOut}$=−16.2° with respect to prism normal 51 and strikes the center of the photosensitive film. As hologram 136 is positioned and rotated, mirror 78, spatial filter 84 and collimating lens 138 must be repositioned to maintain the conjugate illumination beam.

Again as noted above, all of the light beams must strike the same area of the photosensitive film after passing through the prism in order to form the two superimposed holograms. The sizes and positions of rectangular apertures 81, 83 and 87 are adjusted so that the beams all fill the same rectangular area on the photosensitive film.

The procedures to make an exposure and to process the photosensitive film in this example are similar to the procedures described above for the preferred embodiment except for the adjustment of beamsplitter 72. In this instance, while shutter 68 is open, the variable beamsplitter 72 is first adjusted so that the ratio of the energies of the resulting light beams 75 and 77 reaching the film 20 is between 1.5:1 and 2:1, typical true beam ratios for reflection holography. This range 1.5:1 to 2:1 is an initial range with which to begin making test exposures to find the best value, which depends on the characteristics of hologram master 136.

For one skilled in the art, it is apparent that the angles of the light beams in manufacturing apparatus 134 can easily be varied within certain ranges by changing the positions and orientations of mirrors 76, 78, 92 and 94, rectangular apertures 81, 83 and 87, off-axis laser transmission hologram 136, collimating lens 138 and spatial filters 82 and 84. Also, prism 40 can be interchanged with other prisms having different face angles and thicknesses for even more flexibility. This flexibility allows this setup to be used to create a variety of different holographic resonant systems which produce images recorded from a master hologram by varying exposure angles, $\theta_{1recIn}$, $\theta_{1recOut}$, $\theta_{2recIn}$ and $\theta_{2recOut}$.

The manufacturing apparatuses described above only easily support internal recording angles, $\theta_{1recInInt}$ and $\theta_{1recOutInt}$ and $\theta_{2recInInt}$ and $\theta_{2recOutInt}$, which are less than 85° and greater than −85°. It is apparent to one skilled in the art that internal recording angles greater than 95° and less than −95° can be achieved by index-matching a prism to the rear surface of the film or by using a tank filled with index-matching fluid. By using a front and back prism or an index-matching tank, the ranges of internal recording angles that are not easily useable are 85° to 95° and −85° to −95°. These ranges can be narrowed by carefully matching the refractive indices of the prism and the index-matching fluid to the refractive index of the film in the case of the front and back prisms. With an index-matching tank, the ranges that are not usable can be narrowed by matching the refractive index of the fluid carefully to the refractive index of the film.

The problem of recording at angles between 85° and 95° and between −85° and −95° can be avoided for a given $\theta_{in}$, $\theta_{out}$, and $\lambda_{playback}$ by choosing different recording wavelengths or inducing shrinkage or swelling in the material. Since the plurality of holograms in the holographic resonant system are each created with a separate set of two beams of light, the values of $\lambda_{record1}$ and $\lambda_{record2}$ do not have to be the same. Thus different wavelengths for creating different holograms in the system can be used to provide additional flexibility by avoiding the ranges of internal recording angles that are not usable. For example, the first hologram in a resonant system could be created with $\lambda_{record1}$=488 nm and the second hologram in the same resonant system could be created with $\lambda_{record2}$=514 nm. In addition, since the sets of light beams, $\theta_{1recIn}$ and $\theta_{1recOut}$, and $\theta_{2recIn}$ and $\theta_{2recOut}$, are separate, different lasers can be used for each set of beams.

For all of the previously described embodiments, there are yet two further possible embodiments for holographic resonant systems for a given $\theta_{in}$, $\theta_{out}$, and $\lambda_{playback}$ if the input angle $\theta_{in}$ and output angle $\theta_{out}$ are not equal. The two embodiments, the obtuse embodiment and the acute embodiment, can have different optical properties even though $\theta_{in}$, $\theta_{out}$, and $\lambda_{playback}$ are the same in both cases.

Figure 15A:
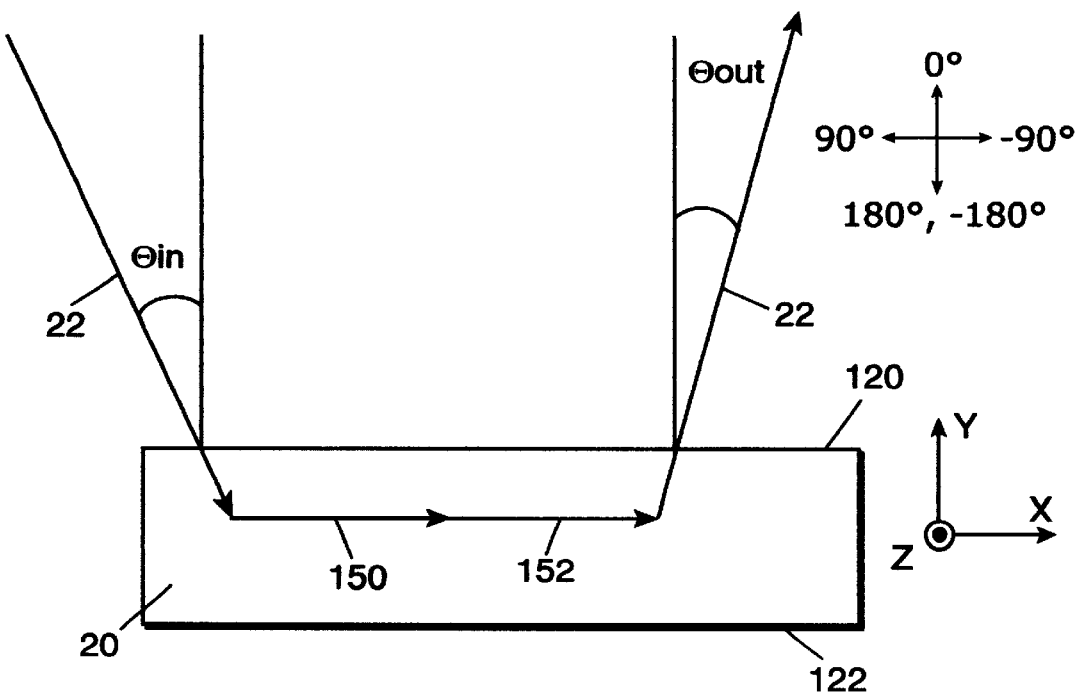
FIG. 15A is a schematic diagram that illustrates the behavior of a light beam incident upon an obtuse embodiment of a single layer holographic resonant system.
Figure 15B:
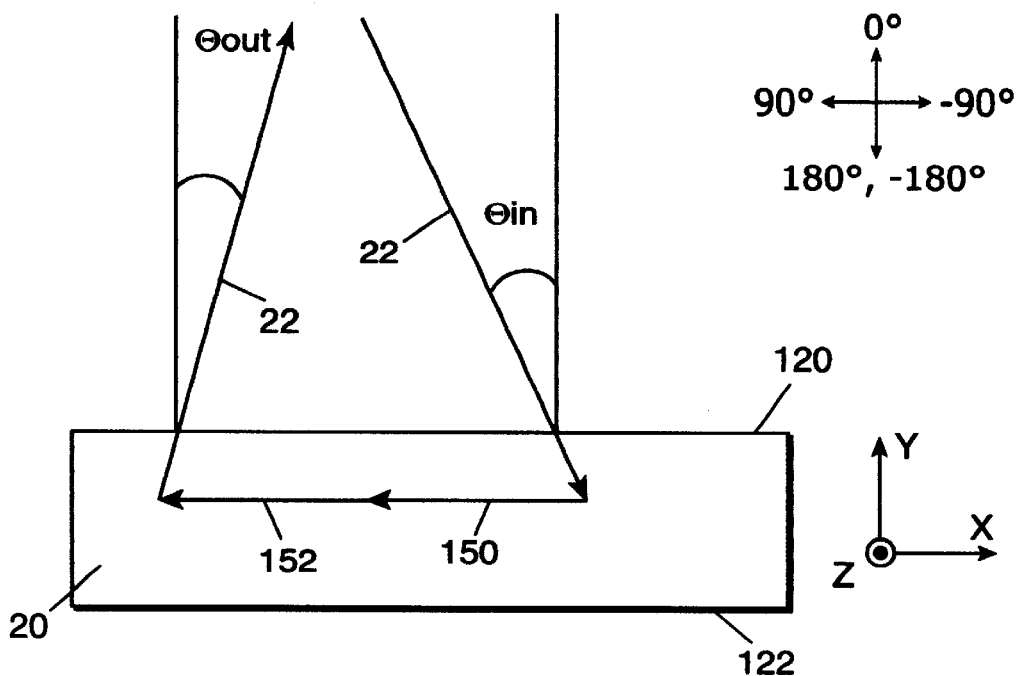
FIG. 15B is a schematic diagram that illustrates the behavior of a light beam incident upon an acute embodiment of a single layer holographic resonant system.

Once values are chosen for the angles $\theta_{1outInt}$ and $\theta_{2inInt}$, the acute and obtuse embodiments for each embodiment described above can be seen by swapping the values between the angles $\theta_{1outInt}$ and $\theta_{2inInt}$. An example of the obtuse embodiment, shown in FIG. 15A, is illustrated with the single layer holographic resonant system described in the preferred embodiment having the following parameters:

For parameters:

$\theta_{in}=30°$ $\theta_{out}=0°$ $\theta_{1outInt}=-90°$ $\theta_{2inInt}=90°$ $f_{shr}=0.96$ $\lambda_{playback}=632$ nm $\lambda_{record1}=488$ nm $\lambda_{record2}=488$ nm $n_{filmproc}=1.522$ $n_{air}=1.000$ $n_{expose}=1.493$ $n_{prism}=1.495$ $\beta_{1\,recIn}=0°$ $\beta_{1recOut}=80°$ $\beta_{2recIn}=-80°$ $\beta_{2recOut}=0°$ The calculations using equations 1–26 result in:

$74_{1recIn}=57.8°$ $\theta_{1recOut}=80.9°$ $\theta_{2recIn}=-74.90°$ $\theta_{2recOut}=-16.2°$ Alternatively, to create the acute embodiment, shown in FIG. 15B, of the single layer holographic resonant system described in the preferred embodiment the values of $\theta_{1outInt}$ and $\theta_{2inInt}$ are swapped and the angles are recalculated.

For parameters:

$\theta_{in}=30°$ $\theta_{out}=0°$ $\theta_{1outInt}=90°$ $\theta_{2inInt}=-90°$ $f_{shr}=0.96$ $\lambda_{playback}=632$ nm $\lambda_{record1}=488$ nm $\lambda_{record2}=488$ nm $n_{filmproc}=1.522$ $n_{air}=1000$ $n_{expose}=1.493$ $n_{prism}=1.495$ The calculations using equations 1–22 result in:

$\theta_{1recInP}=5.0°$ $\theta_{1recOutP}=-73.3°$ $\theta_{2recInP}=76.6°$ $\theta_{2recOutP}=10.8°$ $\beta_{1recIn}=0°$ $\beta_{1recOut}=-80°$ $\beta_{2recIn}=80°$ $\beta_{2recOut}=0°$ The final calculations using equations 23–26 result in:

$\theta_{1recIn}=7.4°$ $\theta_{1recOut}=-70.0°$ $\theta_{2recIn}=74.9°$ $\theta_{2recOut}=16.2°$ Since $\theta_{1recOutP}$ is negative and is $\theta_{2recInP}$ positive, the values of $\beta_{1recOut}$ and $\beta_{2recIn}$ will be different than in all of the previous examples. In addition, the beams corresponding to the angles $\theta_{1recOutP}$ and $\theta_{2recInP}$ will enter the prism from different faces than in all of the previous examples. Even though the input and output angles are identical for the two resonant systems, the wavelength and angular selectivity of the two systems can be different. The two possible resonant systems can be classified into two categories, acute and obtuse by comparing the sums of the absolute values of the $\alpha_1$ and $\alpha_2$ parameters for each system. The resonant system with the greater sum is classified as the obtuse system and the system with the lesser sum is classified as the acute system.

For one skilled in the art, it is apparent that dichromated gelatin films have similar characteristics to the photopolymer film disclosed in the preferred embodiment. Thus, holographic resonant systems can be alternatively created on 20 micron, for example, thick dichromated gelatin. When the film parameters $n_{filmproc}$, $n_{expose}$, energy$_{ReqExposure}$ for the dichromated gelatin are used in conjunction with the above disclosed equations, the required exposure angles can be calculated and applied to the manufacturing apparatuses 60, 134 and 140 shown in FIGS. 5, 13 and 14, respectively. The dichromated gelatin film can also be index matched between the prism and the light absorber in the same manner as the photopolymer. The dichromated gelatin films differ from the photopolymer in that the interleaving of the exposures disclosed in the preferred embodiment is not necessary. In essence, the calculated exposure time does not need to be divided into 20 periods for each shutter. First, shutter 66 can be opened once for a duration of time$_{shutter66}$ and then shutter 68 can be open once for a duration of time$_{shutter68}$ to complete the exposure. The optimal exposure time can be determined by testing fractions and multiples of the calculated exposure time. After the exposure sequence is complete, the dichromated gelatin film is processed using the conventional dichromated gelatin development processes.

As will be readily appreciated by those skilled in the art and others, the holographic resonant system formed in accordance with this invention has a number of advantages. By exposing two volume phase holograms of Bragg gratings on a single layer of photosensitive film where the output of one hologram internally illuminates the other hologram or by layering multiple exposures of film each containing a volume phase hologram for performing the same function, the resulting holographic resonant system has a very narrow illumination angle. A system with a narrow illumination angle produces sharper images since light from directions other than $\theta_{in}$ will not effect the image. In addition since $\lambda_{playback}$ can be chosen arbitrarily, images of many different colors can be made with a single laser wavelength and these colors can be finely controlled.

While the preferred embodiment of the invention has been illustrated and described, it will be appreciated that various changes can be made therein without departing from the spirit and scope of the invention. For example, in addition to those examples noted above, the holographic resonant system can also be created by superimposing or layering more than two holograms, with each hologram diffracting light into the other.

The embodiments of the invention in which an exclusive property or privilege is claimed are defined as follows:

1. A holographic resonant system comprising:
   a photosensitive material having an upper surface and a lower surface and containing at least two superimposed volume phase holograms where:
   a first superimposed volume phase hologram: (i) selects an incoming light beam incident upon the upper surface of the photosensitive material and having an angle $\theta_{in}$ and a wavelength $\lambda_{playback}$; and (ii) diffracts the incoming light beam to produce a first diffracted light beam; and
   a second superimposed volume phase hologram: (i) accepts the first diffracted light beam directly from the first superimposed volume phase hologram; and (ii) diffracts the first diffracted light beam a second time to produce a second diffracted light beam.

2. The holographic resonant system of claim 1, wherein said second diffracted light beam is refracted at the upper surface of the photosensitive material to produce an outgoing light beam having an outgoing angle $\theta_{out}$ and a wavelength $\lambda_{playback}$, said outgoing light beam forming an image.

3. The holographic resonant system of claim 2, wherein the image is a point source image.

4. The holographic resonant system of claim 2, wherein the image is a three-dimensional image.

5. The holographic resonant system of claim 1, wherein said photosensitive material is a photopolymer.

6. The holographic resonant system of claim 1, wherein said photosensitive material is a dichromated gelatin.

7. The holographic resonant system of claim 1, wherein said first diffracted light beam is diffracted parallel to said upper surface of said photosensitive material.

8. The holographic resonant system of claim 1, wherein said first diffracted light beam is diffracted non-parallel to said upper surface of said photosensitive material.

9. The holographic resonant system of claim 1, wherein said first diffracted light beam lies in the same plane as both said incoming light beam and said second diffracted light beam.

10. The holographic resonant system of claim 1, wherein said first diffracted light beam does not lie in the same plane as both said incoming light beam and said second diffracted light beam.

11. The holographic resonant system of claim 1, wherein said plurality of superimposed volume phase volume phase holograms includes another superimposed volume phase hologram which: (i) accepts the second diffracted light beam from the second volume phase hologram; and (ii) diffracts the second diffracted light beam another time to produce another diffracted light beam, the another diffracted light beam for creating an outgoing light beam refracted from the upper surface of the holographic resonant system for forming an image.

12. A holographic resonant system comprising:
a photosensitive material having an upper surface and a lower surface and containing at least two superimposed volume phase holograms, the two superimposed volume phase holograms being exposed on the same area of the photosensitive material, where:
a first superimposed volume phase hologram: (i) selects an incoming light beam incident upon the upper surface of the photosensitive material and having an angle $\theta_{in}$ and a wavelength $\lambda_{playback}$; and (ii) diffracts the incoming light beam to produce a first diffracted light beam; and
a second superimposed volume phase hologram: (i) accepts the first diffracted light beam directly from the first superimposed volume phase hologram; and (ii) diffracts the first diffracted light beam a second time to produce a second diffracted light beam.

13. A holographic resonant system comprising:
a photosensitive material having an upper surface and a lower surface and containing at least two superimposed volume phase holograms where:
a first volume phase hologram: (i) selects an incoming light beam incident upon the upper surface of the photosensitive material and having an angle $\theta_{in}$ and a wavelength $\lambda_{playback}$; and (ii) internally diffracts the incoming light beam to produce a first diffracted light beam; and
a second volume phase hologram: (i) accepts the first diffracted light beam directly from the first superimposed volume phase hologram; and (ii) diffracts the first diffracted light beam a second time to produce a second diffracted light beam.

14. The holographic resonant system of claim 13, wherein the at least two volume phase holograms contained in the photosensitive material are exposed on the same area of the photosensitive material.

* * * * *